(12) United States Patent
Chen et al.

(10) Patent No.: US 11,743,440 B2
(45) Date of Patent: Aug. 29, 2023

(54) TRANSMISSION AND CONSUMPTION OF MULTIPLE IMAGE SUBFRAMES VIA SUPERFRAME

(71) Applicant: Apple Inc., Cupertino, CA (US)

(72) Inventors: Yung-Chin Chen, Saratoga, CA (US); Michael Bekerman, Los Gatos, CA (US); Guy Côté, Aptos, CA (US); Aleksandr M. Movshovich, Santa Clara, CA (US); D. Amnon Silverstein, Palo Alto, CA (US); David R. Pope, Campbell, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 17/234,510

(22) Filed: Apr. 19, 2021

(65) Prior Publication Data

US 2022/0337799 A1   Oct. 20, 2022

(51) Int. Cl.
| | |
|---|---|
| *H04N 13/111* | (2018.01) |
| *H04N 13/178* | (2018.01) |
| *G06T 19/00* | (2011.01) |
| *G06T 15/00* | (2011.01) |
| *H04N 13/122* | (2018.01) |

(52) U.S. Cl.
CPC .......... *H04N 13/111* (2018.05); *G06T 15/005* (2013.01); *G06T 19/006* (2013.01); *H04N 13/122* (2018.05); *H04N 13/178* (2018.05)

(58) Field of Classification Search
None
See application file for complete search history.

(56) References Cited

U.S. PATENT DOCUMENTS

| | | | | |
|---|---|---|---|---|
| 3,632,865 | A | * | 1/1972 | Haskell ................... G06T 7/254 375/240.12 |
| 3,755,789 | A | * | 8/1973 | Collins ..................... H04L 5/22 710/60 |
| 5,406,322 | A | * | 4/1995 | Port ....................... H04L 12/433 348/14.07 |
| 6,209,021 | B1 | * | 3/2001 | Ahimovic ............... G06F 9/543 370/537 |
| 6,956,600 | B1 | | 10/2005 | Gaylord |
| 6,957,350 | B1 | | 10/2005 | Demos |
| 7,360,230 | B1 | | 4/2008 | Paz et al. |
| 7,548,653 | B2 | | 6/2009 | Olshansky et al. |
| 8,416,847 | B2 | | 4/2013 | Roman |
| 8,896,668 | B2 | | 11/2014 | Goma et al. |
| 9,185,386 | B2 | | 11/2015 | Ozawa et al. |
| 9,438,881 | B2 | | 9/2016 | Leontaris et al. |
| 9,986,220 | B2 | | 5/2018 | Newton et al. |
| 10,275,880 | B2 | | 4/2019 | Barnes et al. |
| 10,536,666 | B1 | * | 1/2020 | Robertson ............ G11B 27/036 |

(Continued)

*Primary Examiner* — Jason A Pringle-Parker
(74) *Attorney, Agent, or Firm* — Fletcher Yoder, P.C.

(57) ABSTRACT

In one embodiment, a system includes a first device rendering image data, a second device storing the image data, and a display panel that displays the image data stored in the memory. The first device renders multiple frames of the image data, compresses the multiple frames into a single superframe, and transports the single superframe. The second device receives the single superframe, decompresses the single superframe into the multiple frames of image data, and stores the image data on a memory of the second device.

22 Claims, 12 Drawing Sheets

(56) References Cited

U.S. PATENT DOCUMENTS

| | | | |
|---|---|---|---|
| 2001/0020981 A1* | 9/2001 | Jun | G06F 16/739 |
| | | | 715/721 |
| 2004/0080482 A1* | 4/2004 | Magendanz | G06F 3/1446 |
| | | | 345/100 |
| 2004/0131249 A1* | 7/2004 | Sandrew | G06T 11/001 |
| | | | 382/254 |
| 2004/0179591 A1 | 9/2004 | Wenger et al. | |
| 2005/0084006 A1* | 4/2005 | Lei | H04N 19/597 |
| | | | 375/E7.199 |
| 2010/0037283 A1* | 2/2010 | Zhu | G06F 3/14 |
| | | | 725/135 |
| 2010/0039447 A1* | 2/2010 | Nakao | G06T 11/60 |
| | | | 345/473 |
| 2011/0126159 A1* | 5/2011 | Ko | H04N 5/44504 |
| | | | 715/848 |
| 2011/0148919 A1* | 6/2011 | Heggelund | G06T 15/005 |
| | | | 345/629 |
| 2011/0228848 A1* | 9/2011 | Dvir | H04N 19/107 |
| | | | 375/E7.076 |
| 2012/0106921 A1 | 5/2012 | Sasaki et al. | |
| 2013/0083160 A1* | 4/2013 | Ballocca | H04N 19/44 |
| | | | 348/42 |
| 2014/0074805 A1* | 3/2014 | Kapoor | G06F 16/24561 |
| | | | 707/693 |
| 2015/0373402 A1 | 12/2015 | Zimmeri et al. | |
| 2016/0227228 A1* | 8/2016 | Pomeroy | H04N 5/772 |
| 2017/0078653 A1* | 3/2017 | Bi | B60R 1/00 |
| 2017/0280126 A1* | 9/2017 | Van der Auwera | G06T 3/0056 |
| 2019/0272616 A1* | 9/2019 | Lee | H04N 19/90 |
| 2019/0364205 A1* | 11/2019 | Wozniak | H04N 21/4728 |
| 2020/0133696 A1* | 4/2020 | Zimmermann | H04L 65/764 |
| 2020/0351341 A1 | 11/2020 | Illowsky et al. | |

\* cited by examiner

TRANSMISSION AND CONSUMPTION OF MULTIPLE IMAGE SUBFRAMES VIA SUPERFRAME

BACKGROUND

The present disclosure relates generally to image processing and, more particularly, to transporting video data between different devices rendering the video data and displaying the video data to an electronic display.

Electronic devices often use one or more electronic display to present visual representations of information (e.g., text, still images, video) based on corresponding image data. For example, such electronic devices may include computers, mobile phones, portable media devices, virtual-reality headsets, and vehicle dashboards, among many others. To display an image, an electronic display may control light emission (e.g., luminance) of its display pixels on corresponding image data.

Some display systems may include different devices and/or different chips for processing and/or displaying image data on a display. However, in some instances, multiple cameras may provide the video data, which includes a large number of frames of video data. As such, transporting the frames one at a time between the devices may take substantial time. Moreover, transporting the large number of frames at the same time may be difficult without creating a new interface between the devices, such as by adding new components or other hardware, to transport the multiple frames simultaneously.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a first device rendering image data, a second device storing the image data, and a display panel that displays the image data stored in the memory. The first device renders multiple frames of the image data, compresses the multiple frames into a single superframe, and transports the single superframe. The second device receives the single superframe, decompresses the single superframe into the multiple frames of image data, and stores the image data on a memory of the second device.

In another embodiment, an image processing circuitry receives a first set of multiple frames of image data corresponding to a video at a first device, compresses the first set of multiple frames into a single frame, transports the single frame to a second device for displaying, decompresses the single frame at the second device into a second set of multiple frames different than the first set of multiple frames, of the image data, and stores the second set of multiple frames on a memory of the second device to facilitate displaying the video on a display panel.

In yet another embodiment, an electronic device includes a display panel and a first chip that includes image processing circuitry. The image processing circuitry receives multiple frames of video data and multiplexes the multiple frames into a single superframe. The image processing circuitry also transports the single superframe to a second chip of the electronic device to facilitate displaying the video data on the display panel.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
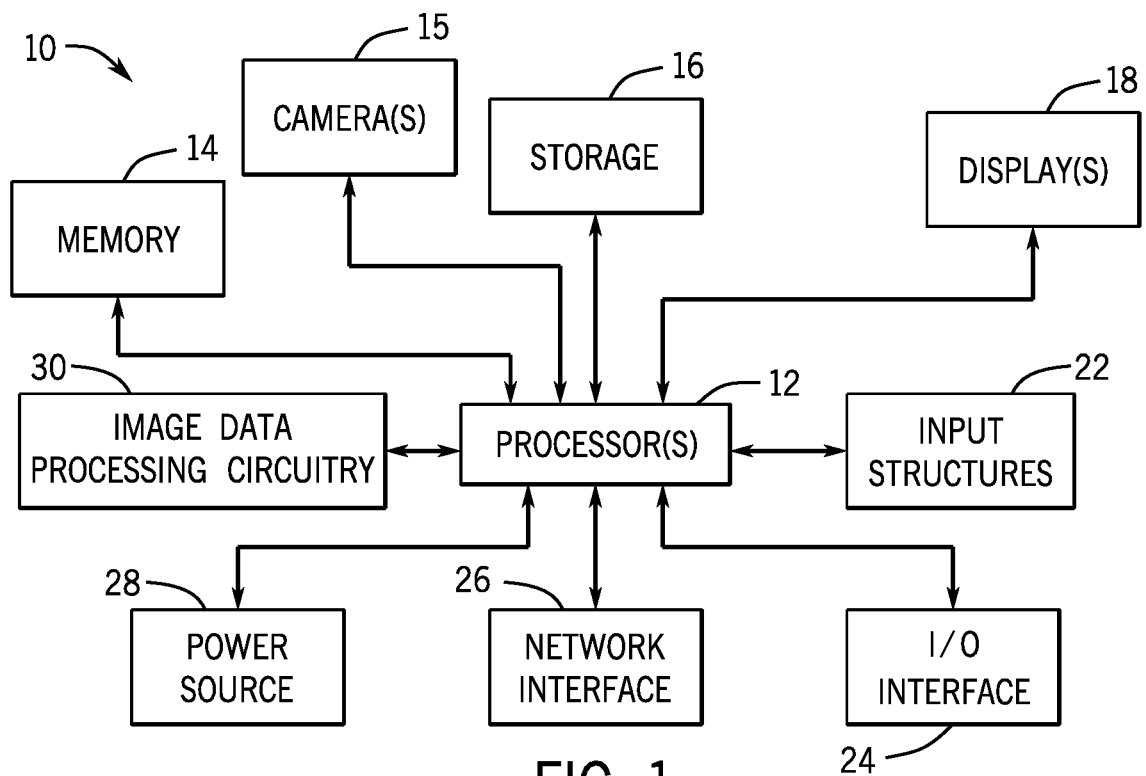
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure generally relates to electronic displays, which may be implemented to display image frames. Generally, an electronic display may display an image by controlling light emission and thus the luminance of each display pixel based at least in part on corresponding image data. Image data processing circuitry (e.g., a display pipeline) may process image data before an electronic display uses the image data to display a corresponding image. The image data processing circuitry, for example, may include image data processing circuitry organized into one or more image data processing blocks that sequentially perform various operations on image data.

By way of example, the electronic display may be or represent one or more displays for an entertainment system, such as in an extended reality (XR) system. An extended reality (XR) system may include real-and-virtual combined environments and human-machine interactions generated by computer technology and wearables. By way of example, an extended reality (XR) system may support augmented reality (AR), mixed reality (MR), and virtual reality (VR). In some instances, the entertainment system may enable simulation of a three-dimensional image or environment that can be interacted within a seemingly real or physical way by a user using special electronic equipment (e.g., helmet or glasses with a display inside or gloves fitted with sensors), referred to as virtual reality (VR). The entertainment system may also enable the three-dimensional image to project onto real objects, merging realities, referred to as augmented reality (AR). In other instances, the entertainment system may combine elements of both AR and VR, in which real-world and digital objects interact, referred to as mixed reality (MR). The entertainment system may also update the displayed image as the user moves or changes orientation using gyroscopes, accelerometers, or the like. In many cases, the image data to be displayed for the entertainment system may include multiple frames of image data (e.g., streams of image data).

In one particular example, the user may see two separate images of image data on the display of the entertainment system, one for the left eye and one for the right eye, which the user may perceive as a single image in three-dimensional form. Moreover, the entertainment system may include multiple cameras capturing the multiple frames of image data, and use multiple devices and/or chips for rendering and displaying the image data. For example, image data processing circuitry of the entertainment system may use a first chip (e.g., of a first device) to render the image data and a second chip (e.g., of a second device) to display the image data in the entertainment system. The second chip may be a companion chip, which expands the capabilities of the first chip by adding features or capabilities. In some instances, the first chip may render the image data (e.g., "producer" of image data) while the second chip stores the image data for display by a display system (e.g., "consumer" of the image data) of the entertainment device. By way of example, the entertainment system may include a computer with the first chip that sends the image data to virtual glasses with the second chip to display the image data. By way of other examples, the entertainment system may include a handheld electronic device (e.g., a cellular phone) with the first chip that sends the image data to the virtual glasses with the second chip, a handheld tablet with the first chip that sends the image data to the virtual glasses with the second chip, the handheld electronic device with the first chip that sends the image data to one or more dashboards of a vehicle with the second chip, the computer with the first chip that sends the image data to multiple displays with the second chip, and the like.

As such, the present disclosure provides techniques for efficiently transporting the multiple frames of image data between chips. Specifically, the image data processing circuitry for the chip rendering the multiple frames (e.g., streams of image data), one for the left eye and one for the right eye, may combine the multiple frames to send a single frame of image data, referred to as a "superframe," for transportation to the companion chip. Thus, in some instances, each of the multiple frames may be combined into a single frame for any suitable transportation protocol, such as but not limited to Mobile Industry Processor Interface (MIPI), DisplayPort (DP), Low Power Display Port (LPDP), and the like. Upon receiving the superframe, the image data processing circuitry for the companion chip may demultiplex (e.g., decompress) the superframe into smaller frames of image data to store on memory associated with the companion chip. The smaller frames may be the same size or a different size than the rendered multiple frames, and include the same or different data than the multiple frames (e.g., smaller frames includes only metadata or only video data instead of video data and metadata in the multiple frames). Subsequently, the display system of the entertainment system may read the smaller frames of image data from the memory of the companion chip for displaying the left and right eyes images on the display of the entertainment system.

With the foregoing in mind, FIG. 1 illustrates an electronic device 10 according to an embodiment of the present disclosure may include, among other things, one or more processor(s) 12, memory 14, nonvolatile storage 16, one or more camera(s) 15, one or more display(s) 18, input structures 22, an input/output (I/O) interface 24, a network interface 26, a power source 28, and image data processing circuitry 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
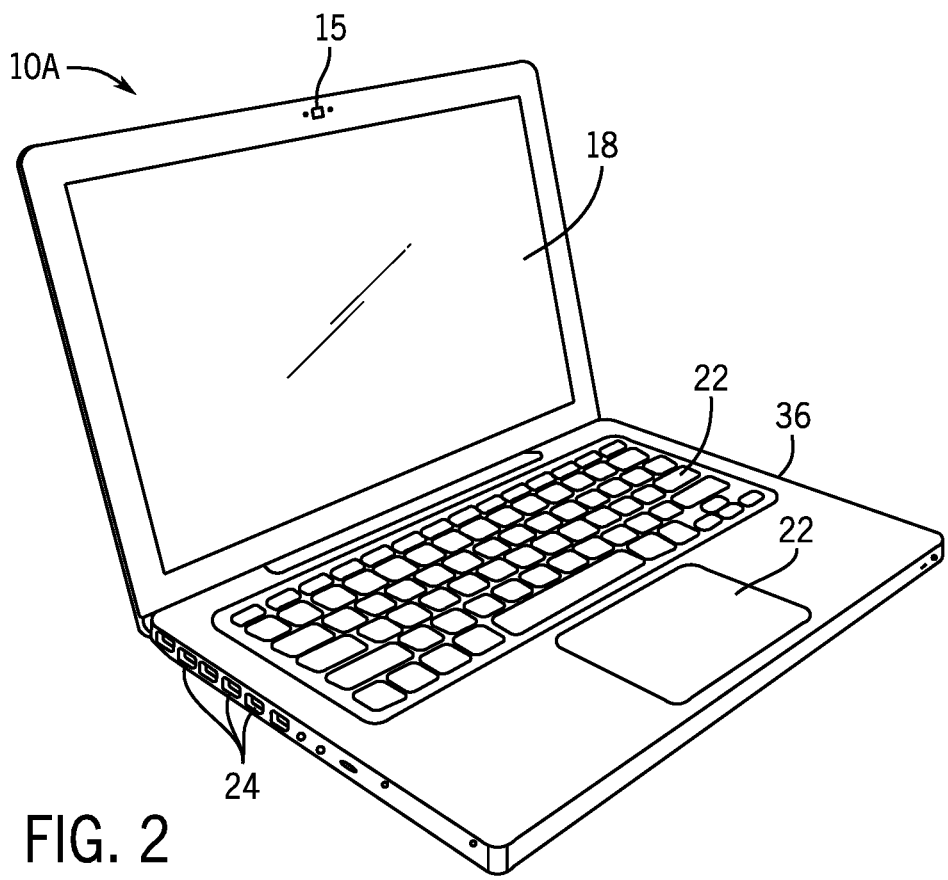
FIG. 2 is an example of the electronic device of FIG. 1 in the form of a notebook computer, in accordance with an embodiment.
Figure 4:
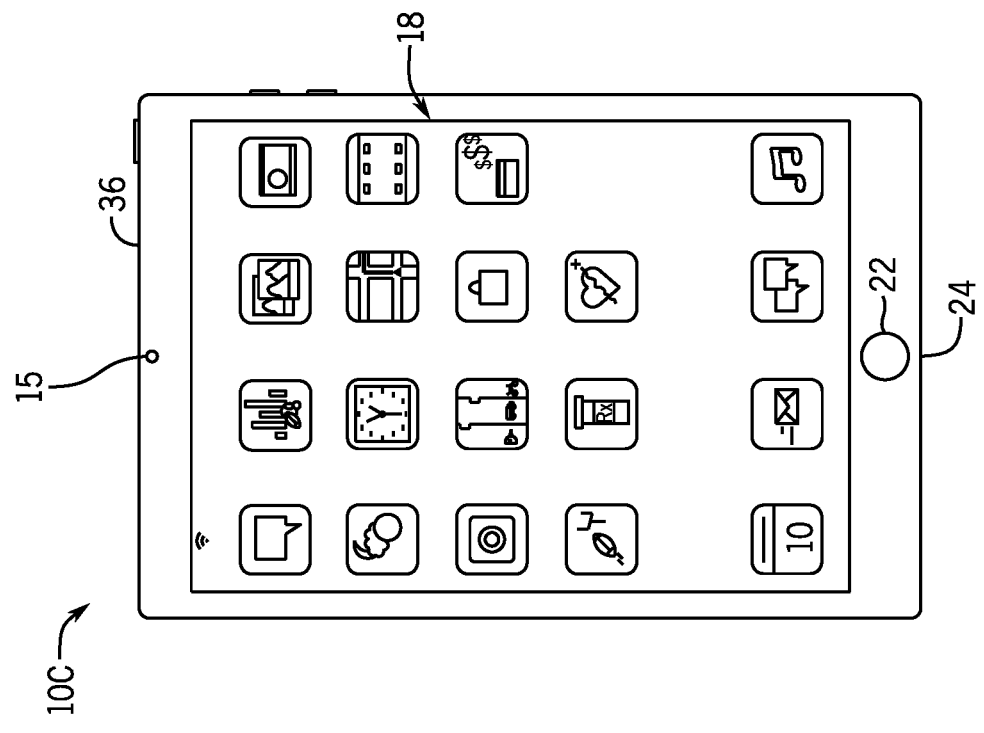
FIG. 4 is another example of the electronic device of FIG. 1 in the form of a handheld device, in accordance with an embodiment.
Figure 3:
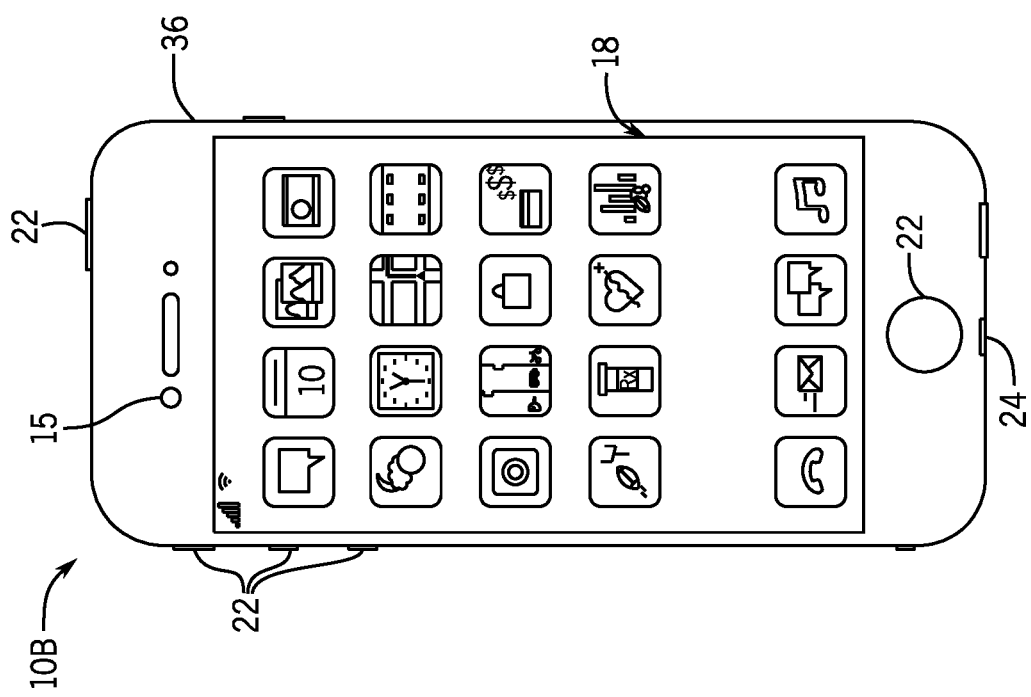
FIG. 3 is another example of the electronic device of FIG. 1 in the form of a handheld device, in accordance with an embodiment.
Figure 5:
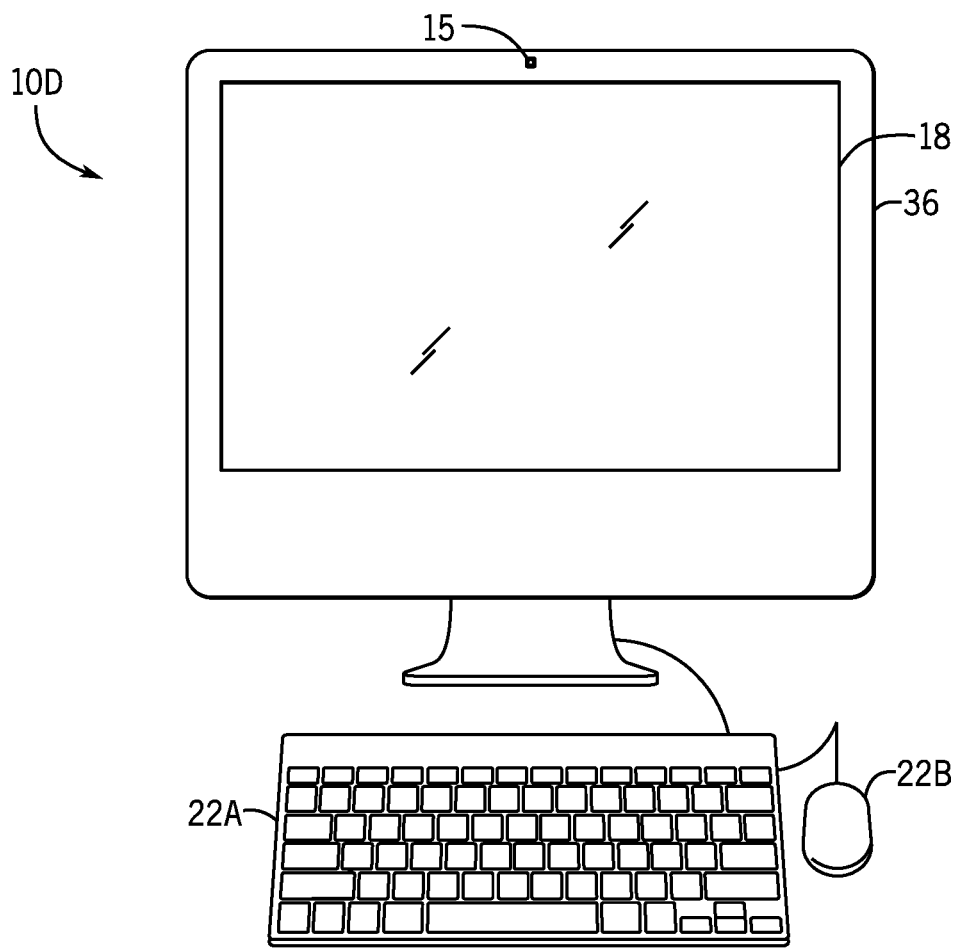
FIG. 5 is another example of the electronic device of FIG. 1 in the form of a desktop computer, in accordance with an embodiment.
Figure 6:
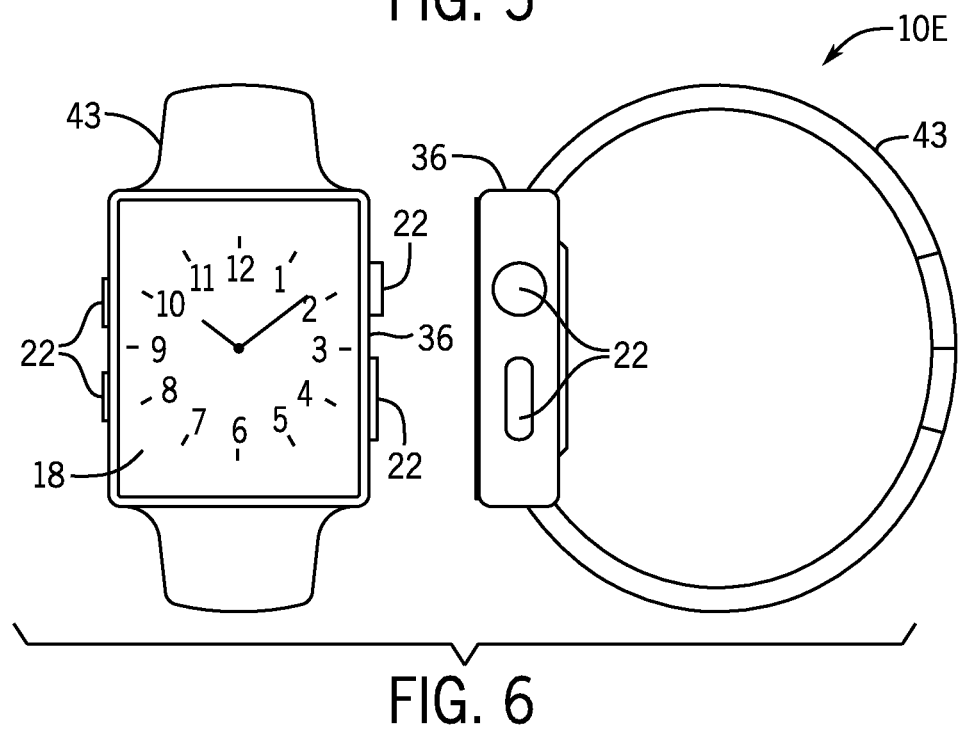
FIG. 6 is another example of the electronic device of FIG. 1 in the form of a wearable electronic device, in accordance with an embodiment.
Figure 7:
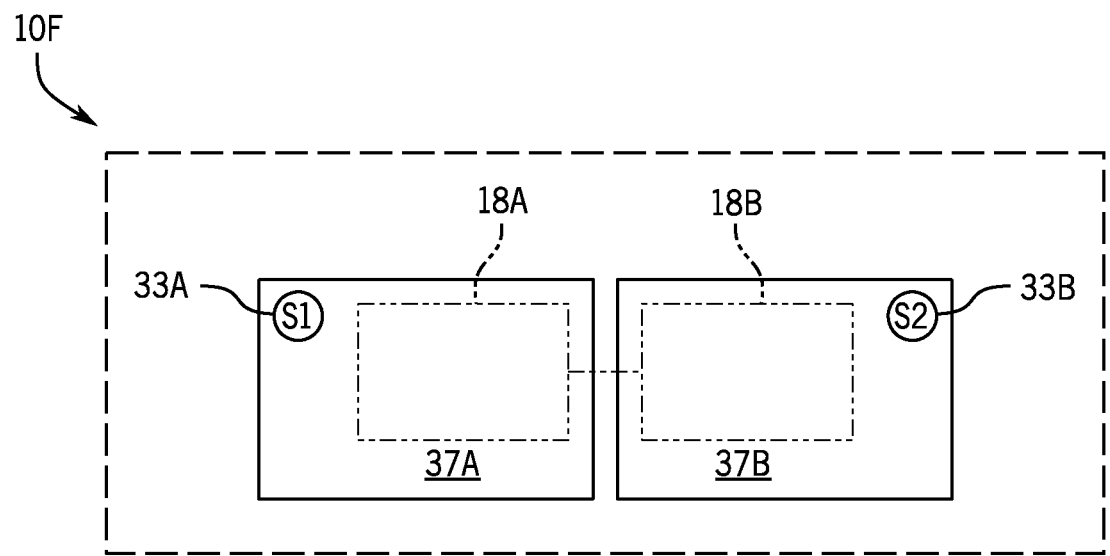
FIG. 7 is another example of the electronic device of FIG. 1 in the form of an extended reality device, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, the extended reality device in FIG. 7, or similar devices. It should be noted that the processor(s) 12 and other related items in FIG. 1 may be generally referred to herein as "data processing circuitry." Such data processing circuitry may be embodied wholly or partially as software and/or hardware. Additionally, the image data processing circuitry 30 (e.g., a graphics processing unit (GPU)) may be included in the processor(s) 12. The processor(s) 12 and other related items in FIG. 1 may be a single contained processing module or may be incorporated wholly or partially within any of the other elements within the electronic device 10. In general, it should be noted that the various depicted components may be combined into fewer components or separated into additional components. For example, the memory 14 and the nonvolatile storage 16 may be included in a single component. Indeed, the nonvolatile storage 16 may include nonvolatile random-access memory.

In the electronic device 10 of FIG. 1, the processor(s) 12 may be operably coupled with a memory 14 and a nonvolatile storage 16 to perform various algorithms. For example, algorithms or instructions (e.g., software) for generating and/or transmitting image data from the camera(s) 15 of one or more sources, compressing multiple frames (e.g., subframes) of image data into a superframe, decompressing the superframe into smaller frames of image data, and so forth, by the image data processing circuitry 30 of a display pipeline (e.g., for the chip rendering the image data (in a first device) and/or the companion chip storing the image data (in a second device) for displaying). Such algorithms or instructions executed by the processor(s) 12 may be stored in any suitable article of manufacture that includes one or more tangible, computer-readable media. For example, the tangible, computer-readable media may include the memory 14 and/or the nonvolatile storage 16, individually or collectively, to store the algorithms or instructions. In particular, the memory 14 and the nonvolatile storage 16 may include any suitable articles of manufacture for storing data and executable instructions, such as random-access memory (RAM), read-only memory (ROM), rewritable flash memory, hard drives, and optical discs. In addition, programs (e.g., an operating system) encoded on such a computer program product may also include instructions that may be executed by the processor(s) 12 to enable the electronic device 10 to provide various functionalities. The processor(s) 12 may include one or more general purpose microprocessors, one or more application specific integrated circuits (ASICs) and/or one or more field programmable gate arrays (FPGAs).

The display(s) 18 may represent any suitable electronic display(s). As previously discussed, the display(s) 18 may represent multiple displays that may display image data corresponding to a left eye and a right eye that is perceived as a single frame, for example, for an extended reality entertainment system. In some embodiments, the display(s) 18 may include one or more light-emitting diode (LED) displays, organic light-emitting diode (OLED) displays, micro-LED (µLED) displays, or some combination of these and/or other display technologies. The display(s) 18 may also include a self-emissive pixel array having an array of one or more of self-emissive pixels. In such embodiments, the display(s) 18 may include any suitable circuitry to drive the self-emissive pixels, such as display drivers like row drivers and/or column drivers. Each of the self-emissive pixels may include any suitable light emitting element, such as an LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

Additionally, the display(s) 18 may control light emission from the display pixels to present visual representations of information based on image data corresponding to the visual representations of information. For example, the display(s) 18 may present graphics including a graphical user interface (GUI) of an operating system, an application interface, a still image, video content, or the like, by displaying frames based at least in part on image data. In particular, the display(s) 18 may be operably coupled to the processor(s) 12 and the image data processing circuitry 30 so that the display(s) 18 may display frames based on the image data generated by the processor(s) 12, the image data processing circuitry 30, or the like. As will be described herein, the display(s) 18 may receive the frames of image data via the network interface 26, the input structures 22, and/or the I/O interface 24, for example, captured by the one or more camera(s) 15.

The image data processing circuitry 30 may include one or more image processing blocks, such a compression and/or decompression block, to reformat multiple frames of image data into a superframe or reformat a superframe into smaller frames of image data (e.g., for a left eye image and a right eye image). The processor(s) 12 may change configuration of the image data processing circuitry 30, such as to use or not use certain image processing blocks, based on the task to be implemented, such as to compress the image data into the superframe or decompress the superframe into the subframes.

The input structures 22 of the electronic device 10 may enable a user to interact with the electronic device 10 (e.g., pressing a button to increase or decrease a volume level). In some embodiments, the input structures 22 may include touch-sensing components in the display(s) 18. The touch sensing components may receive user inputs by detecting occurrence and/or position of an object touching the surface of the electronic display(s) 18.

The I/O interface 24 may enable the electronic device 10 to interface with various other electronic devices, as may the network interface 26, such as to receive the image data. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 30-300 GHz). In some embodiments, a transceiver of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power source 28 may provide electrical power to one or more components in the electronic device 10, such as the processor(s) 12 and/or the electronic display(s) 18. Thus, the power source 28 may include any suitable source of energy, such as a rechargeable lithium polymer (Li-poly) battery and/or an alternating current (AC) power converter. The power source 28 may use distribution rails and/or additional smaller power sources within the electronic device 10 to aid in supplying power to the one or more components.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The depicted notebook computer 10A may include a housing or enclosure 36, one or more cameras 15, a display 18, input structures 22, and ports of an I/O interface 24. In one embodiment, the input structures 22 (such as a keyboard and/or touchpad) may be used to interact with the notebook computer 10A, such as to start, control, or operate a graphical user interface (GUI) and/or applications running on notebook computer 10A. For example, a keyboard and/or touchpad may allow a user to navigate a user interface and/or an application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, Calif. The handheld device 10B may include a camera 15 and an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, Calif., a universal serial bus (USB), or other similar connector and protocol.

The input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, Calif. It should be noted that the computer 10D may also represent a personal computer (PC) by another manufacturer. A similar enclosure 36 may be provided to protect and enclose internal components of the computer 10D, such as the camera 15 and the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. of Cupertino, Calif. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Moreover, FIG. 7 depicts extended reality device 10F representing another embodiment of the electronic device 10 of FIG. 1 that may be configured to operate using the techniques described herein. Generally, the extended reality device 10F may include one or more devices for displaying multiple frames of image data. By way of example, the extended reality device 10F may be an extended reality (XR) headset that is part of the entertainment system. As an extended reality headset, the extended reality device 10F may include an augmented reality (AR) headset, a mixed reality (MR) headset, a virtual reality (VR) headset, and so forth. Generally, the extended reality device 10F may include multiple light-transmissive viewing surfaces 37 (e.g., lenses) that are directly or communicatively coupled (as indicated by the dashed line). In the depicted embodiment, the extended reality device 10F includes a first light-transmissive viewing surface 37A that enables visually perceiving background image content (e.g., through a left eye of a user), such as the frame of a first background image content. Similarly, the extended reality device 10F also includes a second light-transmissive viewing surface 37B, which enables visually perceiving a second background image content (e.g., through a right eye of the user).

The extended reality device 10F may also include multiple optical sensors 33 implemented (e.g., deployed) proximate the light-transmissive viewing surfaces 37. In particular, the extended reality device 10F may include a first optical sensor 33A proximate the first light-transmissive viewing surface 37A and a second optical sensor 33B proximate the second light-transmissive viewing surface 37B. In some embodiments, the first optical and/or the second optical sensors 33 may include image sensors that capture a frame of background image content by generating captured background image data indicative of optical (e.g., visual) characteristics, such as color and/or brightness level, at one or more specific locations (e.g., bright green grass in daylight at a park location). In some embodiments, the extended reality device 10F may also include one or more cameras 15, which may be integrated into the optical sensors 33.

Furthermore, as in the example depicted in FIG. 7, the extended reality device 10F may include multiple displays 18 implemented (e.g., deployed) on the light-transmissive viewing surfaces 37. In particular, the extended reality device 10F may include a first display 18A implemented on the first light-transmissive viewing surface 37A and a second display 18B implemented on the second light-transmissive viewing surface 37B to enable actively displaying image content (e.g., video data), such as augmented reality image content. As previously discussed, the first display panel 18A and the second display panel 18B may update displayed image content by displaying the augmented reality image content along with the background image content as the user 31 moves or changes orientation to provide the entertainment experience. Furthermore, and as previously mentioned, cameras 15 may capture frames of image data (e.g., the augmented reality image content and/or the background image content) to be displayed on the displays 18 of the light-transmissive viewing surfaces 37 of the extended reality device 10F. In some embodiments, the device rendering the frames of image data and the device displaying the image data may be the same device (e.g., an extended reality device 10F with cameras 15) or different devices in the entertainment system. In the depicted embodiment, a device separate from the extended reality device 10F may render the augmented reality image data and transmit it to the extended reality device 10F in the form of a superframe using the techniques described herein. In some instances, the cameras 15 of the extended reality device 10F may capture image data and the extended reality device 10F may send this image data to the device for processing for subsequent transmission in the superframe back to the extended reality device 10F.

Figure 8:
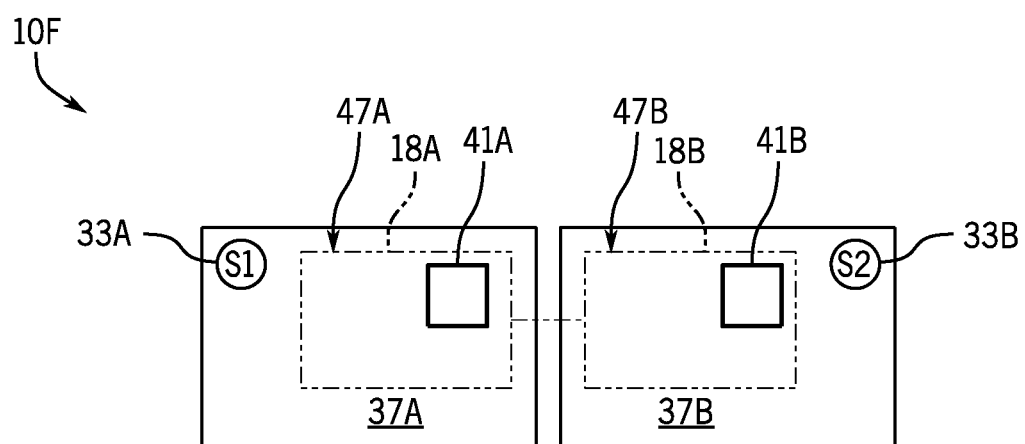
FIG. 8 is an example of image frames perceived through the extended reality device of FIG. 7, in accordance with an embodiment.

FIG. 8 illustrates an example of image frames perceived through the extended reality device 10F of FIG. 7. As previously mentioned, although the following discussions describe the image data for the extended reality device 10F being as augmented reality image content, which describes a particular embodiment, the image content for the systems and methods described herein may also include, mixed reality image content, virtual reality image content, and so forth. In the depicted embodiment, the frames of image data include augmented reality image content 41A and 41B that overlay background (e.g., real) image content 47A and 47B (e.g., captured by the optical sensors 33 of FIG. 7), viewed from through the light-transmissive viewing surfaces 37A and 37B. The extended reality device 10F may receive the image content (e.g., rendered at a first device separate from the extended reality device 10F) via the superframe and display it on the displays 18 of the light-transmissive viewing surfaces 37 of the extended reality device 10F (e.g., the second device for displaying the image content on the displays 18). Specifically, and as will be described herein, the extended reality device 10F may decompress the superframe into smaller frames to store and subsequently display the frames of image data.

Figure 9:
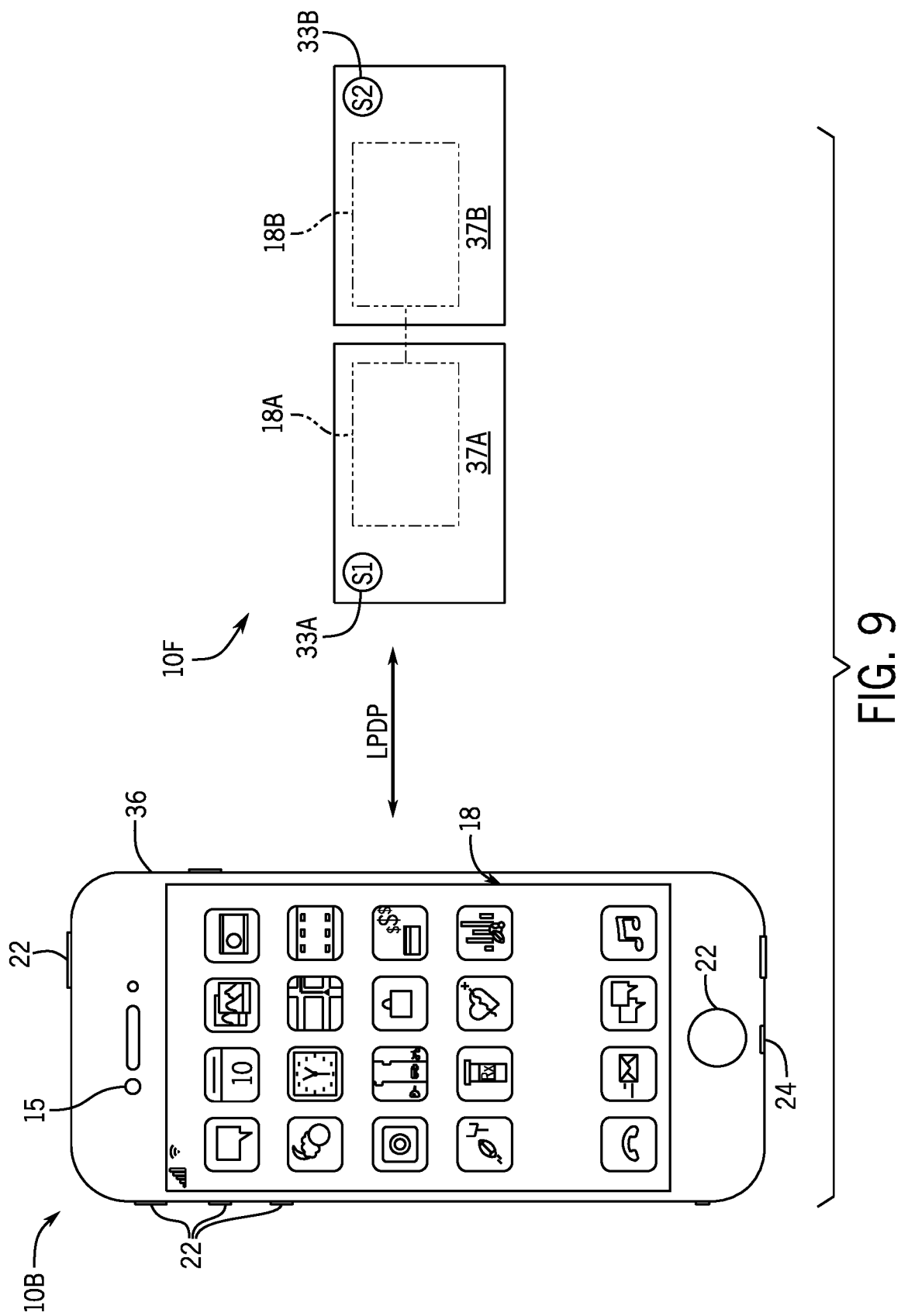
FIG. 9 is a block diagram of the handheld device connected to the extended reality device through a low power display port connection, in accordance with an embodiment.

FIG. 9 is a block diagram of the handheld device 10B connected to the extended reality device 10F through a low power display port (LPDP) connection. As will be discussed in detail herein, the handheld device 10B may send image data in the format of a superframe to the extended reality device 10F for display over the LPDP connection. That is, the handheld device 10B may render the image data for display on the displays 18 on the light-transmissive viewing surfaces 37 (e.g., lenses) by combining multiple frames of the image data (e.g., augmented reality image content 41A and 41B) into a single frame as the superframe. After receiving the superframe, the extended reality device 10F may decompress the superframe into multiple smaller frames for storage in memory on the extended reality device 10F for subsequent display.

Figure 10:
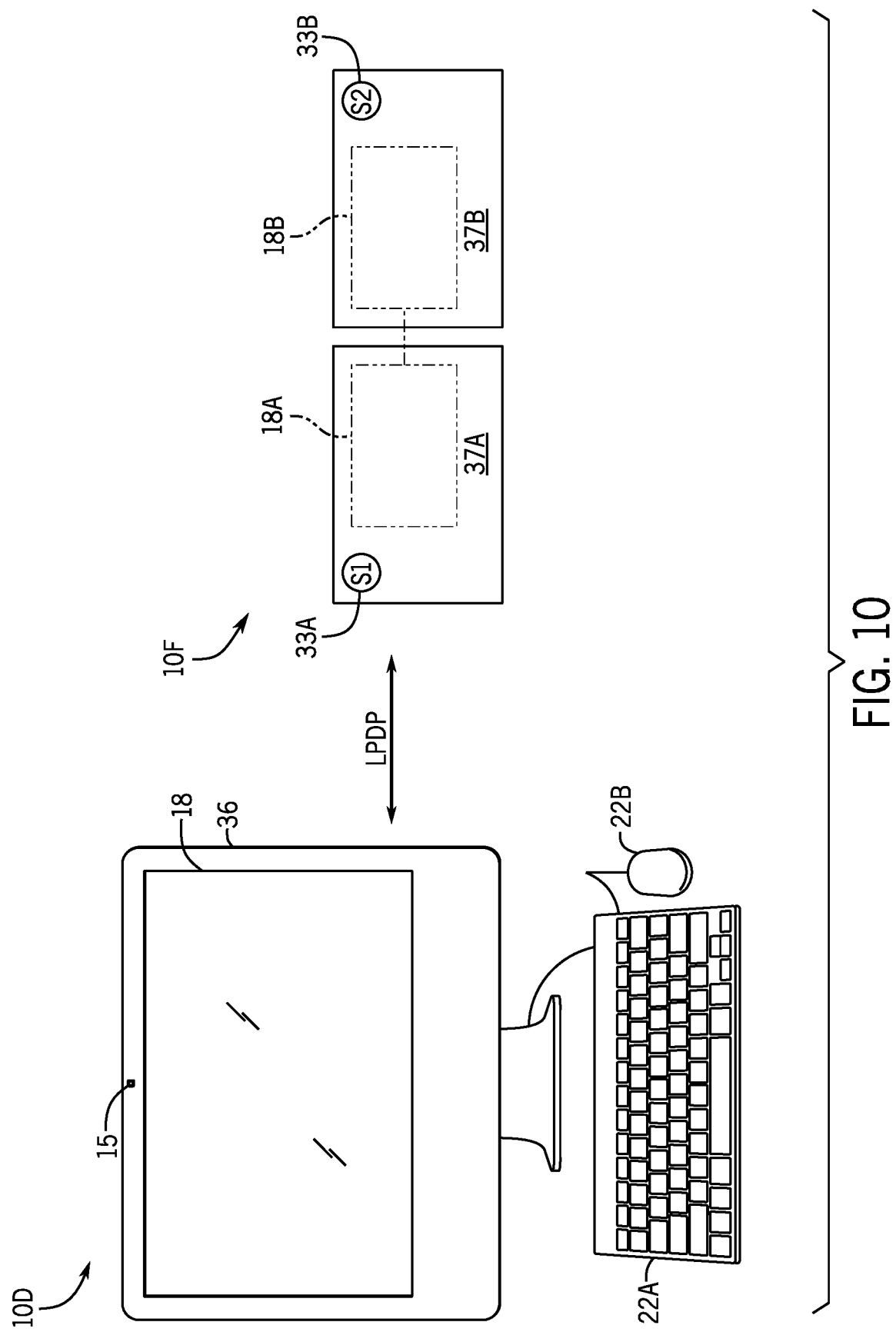
FIG. 10 is a block diagram of the desktop computer connected to the extended reality device through the low power display port connection, in accordance with an embodiment.
Figure 11:
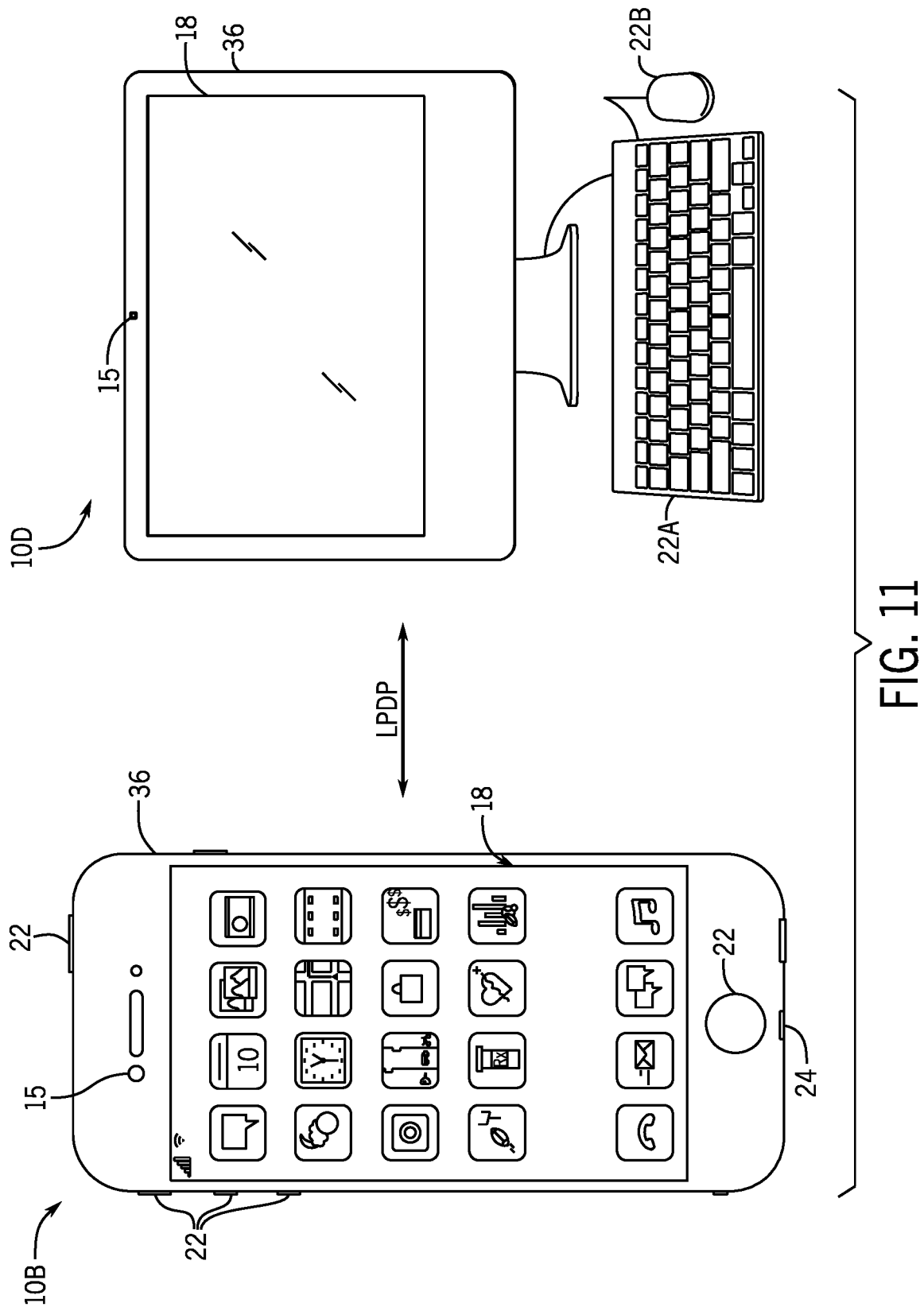
FIG. 11 is a block diagram of the handheld device connected to the desktop computer through the low power display port connection, in accordance with an embodiment.

FIG. 10 is a block diagram of the desktop computer 10D connected to the extended reality device 10F through an LPDP connection. Here, the desktop computer 10D may send the superframe that includes the multiple frames of image data to the extended reality device 10F for display. Similarly, FIG. 11 is a block diagram of the handheld device 10B connected to the desktop computer 10D through an LPDP connection. The handheld device 10B may send the superframe to the desktop computer 10D and the superframe may include multiple frames of image data corresponding to images (e.g., video) for storage in memory associated with the desktop computer 10D and/or for display by the desktop computer 10D.

Figure 12:
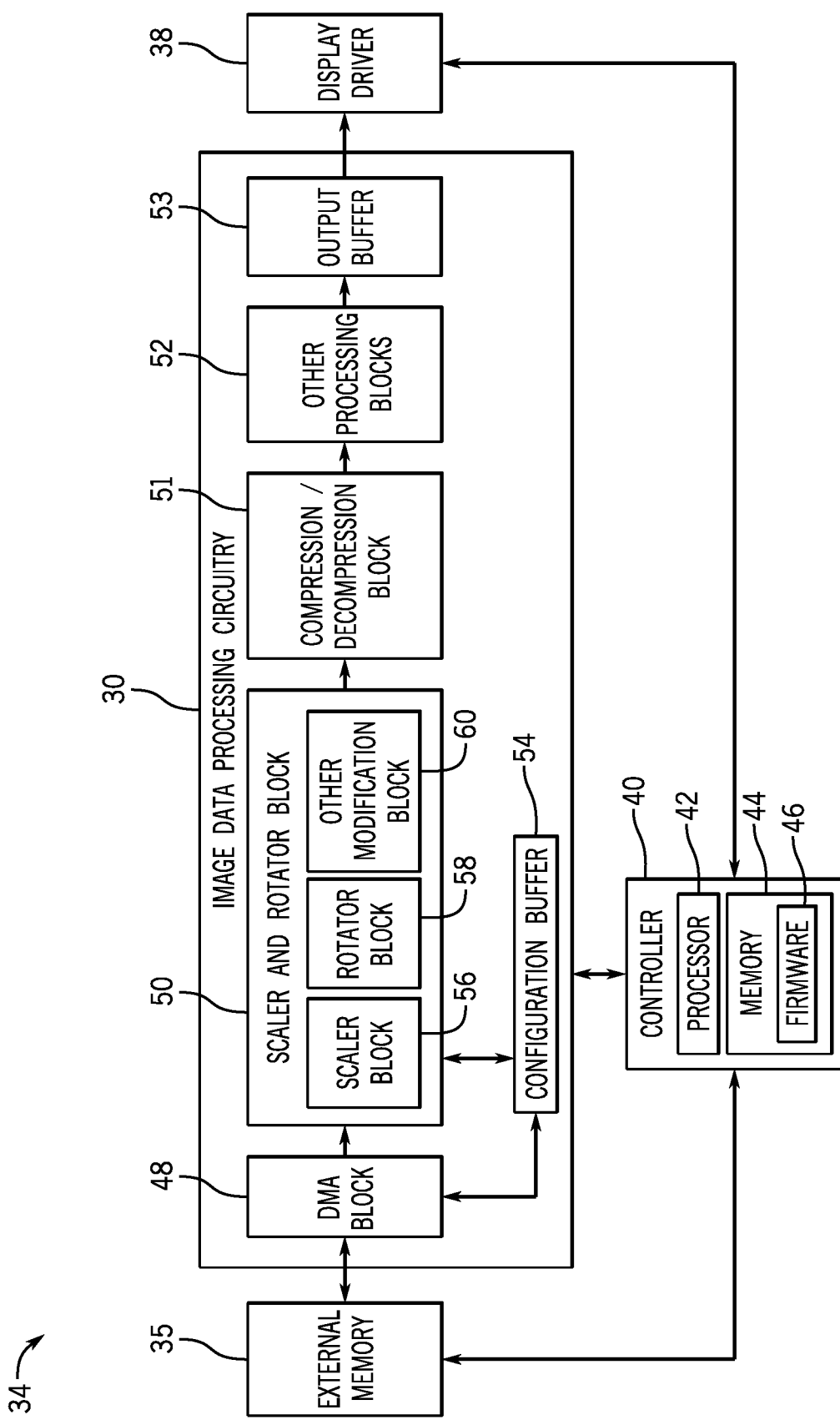
FIG. 12 is a block diagram of an image processing system of the electronic device of FIG. 1, in accordance with an embodiment.

As described above, the display 18 may display images and/or video based on image data received from an image data source. To help illustrate, FIG. 12 illustrates a block diagram of an image processing system 34 of the electronic device 10 that includes image data processing circuitry 30. Although the following descriptions describe one display 18, the systems and methods described herein may include one or more displays 18. In general, the image processing system 34 includes an external memory 35, the image data processing circuitry 30, a display driver 38, and a controller 40. The image data processing circuitry 30 retrieves, processes, and outputs image data. In particular, the image data processing circuitry 30 may receive image data from the external memory 35 (e.g., memory 14 of FIG. 1), analyze and/or process it, for example, by compressing or decompressing image data (e.g., frames), transport the image data between devices prior to displaying, and so forth. Although the following descriptions describe the image data processing circuitry 30 for processing image data (e.g., rendering) on a first chip of a first electronic device 10 and transporting the image data to a second chip (e.g., a companion chip) on a second electronic device 10 for displaying, the systems and methods described herein may apply to one or more chips (e.g., one, three, five, etc.) for processing the image data (e.g., one or more chips for rendering the image data and one or more companion chips for displaying the image data). Further, although the following descriptions describe transporting image data between two chips on different electronic devices 10, the systems and methods described herein may apply to one or more devices (e.g., chips on same device or different devices).

By way of example, the image data processing circuitry 30 may compress multiple frames of image data for transportation between chips and subsequently decompress the image data for storage in memory to be processed for displaying on the display 18. It should be appreciated that the image data processing circuitry 30 (e.g., a display pipeline) may be implemented in the electronic device 10 and/or the display 18. For example, the image data processing circuitry 30 may be included in the processor(s) 12, a timing controller (TCON) in the display 18, other one or more processing units, and/or other processing circuitry. Further, it should be appreciated that the electronic device 10 and/or display 18 may have one or more image data processing circuitries 30 and/or one or more displays 18. For example, the image data processing circuitry 30 may process image data on the first chip of the first electronic device 10 to be transported to the second chip of the second electronic device 10 for displaying.

In some embodiments, the image data processing circuitry 30 may be operatively coupled to the display driver 38 that generates and supplies analog and/or digital electrical signals to display pixels of the display 18 based at least in part on the image data. The system controller 40 may control operations of the external memory 35, the image data processing circuitry 30, the display driver 38, and/or other portions of the electronic device 10. It is noted that the image data processing circuitry 30 may also include control circuitry, such as control circuitry similar to the system controller 40.

The system controller 40 may include a controller processor 42 and controller memory 44. The controller processor 42 may execute instructions, such as a firmware 46, stored in the controller memory 44, the external memory 35, the nonvolatile storage 16 and/or the memory 14 (e.g., of FIG. 1), or a separate tangible, non-transitory, and/or computer readable medium. The controller processor 42 may include the processor(s) 12, the image data processing circuitry 30, a timing controller in the display 18, and/or a separate processing module. Although depicted as a system controller 40, one or more separate system controllers 40 may be used to control operation of the electronic device 10.

As depicted, the image data processing circuitry 30 includes a direct memory access (DMA) block 48, a scaler and rotator block 50, a compression and decompression block 51, any other suitable processing blocks 52, an output buffer 53, and a configuration buffer 54. Although the depicted embodiment shows a particular order of the blocks 48, 50, 51, 52, 53, and 54, the systems and methods described herein may include any order of blocks and thus, any order of the image processing. By way of example, a chip and/or electronic device receiving the superframe 100 for decompression and image processing (e.g., a consumer device), may use the compression and decompression block 51 to decompress the superframe 100 prior to using the other blocks 48, 50, 52, 53, and 54. In additional or alternative embodiments, the blocks 48, 50, 51, 52, 53, and 54 may be additional or alternative circuitry to the image data processing circuitry 30 and/or additional or alternative hardware or software modules. The DMA block 48 may provide the image data processing circuitry 30 access to the external memory 35 (e.g., memory external to the image data processing circuitry 30). For example, the DMA block 48 may retrieve (e.g., read) image data from the external memory 35 (e.g., associated with the first chip for rendering the image data) for processing via image data processing blocks of the image data processing circuitry 30, such as the compression and decompression block 51. Additionally or alternatively, the DMA block 48 may store (e.g., write) processed image data in the external memory 35, for example, after decompressing a superframe into smaller frames of image data.

As shown and previously mentioned, the image data processing circuitry 30 may include multiple image processing blocks, including but not limited to, the scaler and rotator block 50, the compression and decompression block 51, and the other processing blocks 52 (e.g., dither block). In the depicted embodiment, the scaler and rotator block 50 includes a scaler block 56, a rotator block 58, and any other suitable modification block 60 (e.g., flipping block, mirroring block, etc.). Although the scaler block 56, the rotator block 58, and the other modification block 60 are shown as separate blocks, which represents a particular embodiment, the functions performed by these blocks may be integrated into a single block.

The scaler block 56 may adjust image data (e.g., via directional scaling and/or enhancement), for example, to reduce and/or correct image artifacts generally associated with scaling. As an illustrative example, it may be desirable to increase the resolution of image data to enlarge viewing of the corresponding image or accommodate the resolution of a display 18. To accomplish this, the scaler block 56 may employ noise statistics and/or sum of absolute differences (SAD) and differential (DIFF) statistics to analyze the content of the image data and scale the image data to a higher resolution while maintaining image definition (e.g., sharpness). In some embodiments, the image data may also undergo enhancement.

The rotator block 58 may adjust the image data, for example, to facilitate reduce and/or correct image artifacts generally associated with rotating. The rotator block 58 may include one or more rotator cores that include memories and buffers to perform image rotation. The DMA block 48 may fetch image data for one or more pixels or subpixels from the external memory 35, rotate the image data for the entire image and/or blocks of the image data (e.g., 96 pixels by 96 pixels, 128 pixels by 128 pixels, and so forth), and write the rotated image data back to the external memory 35. The rotator block 58 may adjust the image data by rotating the image data by a predetermined rotation increment, such as by 10°, 15°, 45°, 90°, and/or 180°, to produce the rotated image.

The other modification block 60 may include additional processing blocks related to scaling and/or rotation. The other processing block 52 of the image data processing circuitry 30 may include a variety of image data processing blocks corresponding to a variety of functions. By way of example, the other processing block 52 may include a Sub-Pixel Uniformity Compensation (SPUC) block that applies a voltage offset to each sub-pixel to compensate for voltage non-uniformity, a burn-in compensation (BIC)/burn-in statistics (BIS) block that processes image data according to a desired configuration (e.g., apply a computed gain to compensate for burn-in effects), ambient adaptive pixel (AAP) block, a dynamic pixel backlight (DPB) block, a white point correction (WPC) block, a sub-pixel layout compensation (SPLC) block, a panel response correction (PRC) block, a dithering block, an image signal processor (ISP) block, a content frame dependent duration (CDFD) block, an ambient light sensing (ALS) block, or any combination thereof.

The configuration buffer 54 may store configuration entries. The configuration entries may be associated with image data and may indicate how the image data processing circuitry 30 of the image data processing circuitry 30, such as the compression and the decompression block 51, should process the image data. For example, the entries may indicate a format (e.g., rendering multiple streams of image data) and if the format for displaying is different, the image data processing circuitry 30 may reformat the image data into the compatible format (e.g., compressed into a single superframe) for displaying the image data. The entries may also indicate whether the image data processing circuitry 30 may compress the image data, for example, based on a total number of multiple frames to be transported being above a threshold number of frames allowed for transportation during a time period. The configuration buffer 54 may include a buffer that holds configuration information, which may change between image frames. The configuration information may include configuration data for programmable registers of the blocks (e.g., one or more programmable registers for the scaler block 56, one or more programmable registers for the rotator block 58, one or more programmable registers for the compression and decompression block 52, and so forth) in the image data processing circuitry 30. That is, the configuration buffer 54 may hold queued image frame configuration entries for potentially multiple image frames in advance. In some instances, during a blanking period, the image data processing circuitry 30 may load the programmable registers with the configuration entries stored in the configuration buffer 54, thereby enabling the different configurations of the image data processing circuitry 30 for different image frames.

In some embodiments, the configuration buffer 54 may include a shadow FIFO buffer. FIFOs are memory buffers that may behave elastically between synchronous and asynchronous systems by storing data (e.g., queued configuration entries) as received and outputting the data to a system on a first-in-first-out basis. A shadow FIFO buffer operates according to the first-in-first-out principal and contains one or more shadow registers. Shadow registers are used to reduce register load and/or store overhead when invoked (e.g., requested during a handling interrupt) as they may serve as a copy of general purpose registers. For example, a FIFO interrupt may request loading data in a shadow register to the programmable register. In such instances, the data may be provided directly to the programmable register without any RAM cycles (e.g., memory bus requests). Although the following descriptions describe the configuration buffer 54 as a shadow FIFO buffer, which represents a particular embodiment, the configuration buffer 54 may be any suitable memory buffer that may store configuration entries.

The compression and decompression block 51 may compress multiple frames of image data (e.g., video data) into a superframe, a single frame of image data. Although the following descriptions describe the compression and decompression block 51 as one block, which represents a particular embodiment, compressing the multiple frames into the superframe and decompressing the single superframe into the smaller frames may be implemented by one or more blocks and/or performed in different sequences.

As previously discussed, the first chip receiving the image data may receive multiple frames of image data. After receiving the image data, the first chip may transport the image data to the second chip (e.g., a companion chip) that processes the image data for displaying. To efficiently transport the multiple frames of image data, the multiple frames may be reformatted prior to transporting to facilitate faster processing using the second chip. Accordingly, the compression and decompression block 51 may compress the multiple frames of image data into a superframe. Specifically, the compression and decompression block may multiplex data from multiple buffers storing the image data to generate the superframe. After generating the superframe, the first chip may transport the superframe to the second chip to simultaneously transport multiple frames over a single link between the chips. Upon receiving the superframe, the compression and decompression block 51 may demultiplex the superframe back to a few smaller frames and data for the second chip. In this manner, the superframe may facilitate faster transportation of image data between chips without creating new or additional interfaces to transport the image data between the chips.

Once the image data has been processed by the image data processing circuitry 30 (e.g., the scale and rotator block 50, the compression and decompression block 51, and/or the other processing block 52) according to the configuration entries transmitted by the configuration buffer 54, the processor(s) 42 may temporarily store the processed image data in the output buffer 53 (e.g., circular buffers associated with the second chip) before the display driver 38 or a display panel of the device 10 retrieve the processed image data. The output buffer 53 may act as a reservoir for processed image data, storing multiple frames at any given time. As such, the output buffer 53 may prevent lag in displaying a new image frame on the display 18 when requested by the display driver 38. Further, the display driver 38 may be a semiconductor integrated device that functions as an interface between, for example, the image data processing circuitry 30 and the display 18, and may be used to drive each pixel display line in an allotted amount of time.

Figure 13:
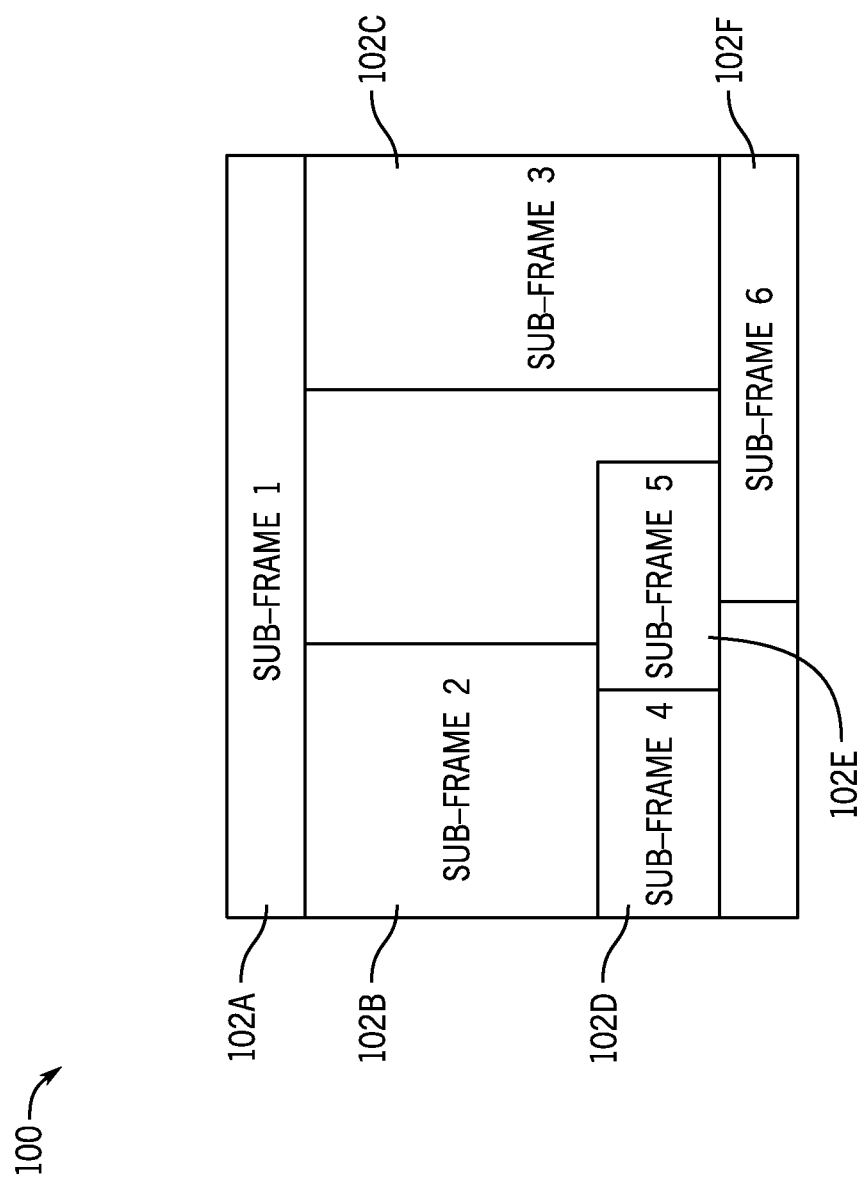
FIG. 13 is a block diagram of a superframe transported within the image processing system of FIG. 12.

FIG. 13 is a block diagram of a superframe 100 transported within the image processing system 34 of FIG. 12. In general, the image data transported between chips (e.g., associated with the same or different devices) may include multiple types of data, such as metadata, matting data, mesh parameters, and video data. The metadata may be generated by an image signal processor (ISP), a central processing unit, or an ISP module of the electronic device 10. The metadata may include camera settings and state for one or more cameras, timestamps, settings and state of auxiliary devices (e.g., indicating which eye-glint LEDs are turned on), statistics computed by one or more cameras, and/or statistics computed by the ISP. Matting data may indicate an alpha matte and foreground associated with the image data, such as a video sequence, to facilitate blending graphics and camera video to generate a final output. The mesh parameter may enable 3D reconstruction and effects, for example, for video data to create a virtual reality on the entertainment system. The video data may include the video data for displaying on the display, such as video data for left and right eyes.

Different sources may provide each of these types of data. For example, the data may be generated by a central processing unit (CPU), a graphics processing unit (GPU), machine learning circuitry such as an Apple Neural Engine® (ANE) available from Apple Inc. of Cupertino, Calif. that may apply machine learning processing to enhance image data, and/or other co-processors of the first chip or electronic device 10 rendering the image data, and the like. In some embodiments, the different data types may be combined into one superframe 100 for output to a display system (e.g., to display on the display 18). However, in other embodiments, such as when frame configuration changes for each or majority of the frames so that the metadata is not identical for the frames, a single superframe 100 may include only the metadata. Similarly, another superframe 100 may include only the mesh parameters, and yet another superframe 100 may include only the video data. Transporting each of the data types via a different superframe 100 may reduce software efforts to parse and search for each of the datatypes in one superframe 100. In some instances, the first chip receiving the image data may pre-calculate mesh wrap parameters so that the second chip does not perform functions or calculations in addition to the demultiplexing of the superframe 100. The GPU of the first chip rendering the image data may render video in multiple resolutions and frame rates, such as either 90 Hz or 96 Hz.

In general, the superframe 100 is a virtual video frame structure that holds multiple smaller video frames and data. The superframe 100 may facilitate low latency transportation of image data between the first chip and second chip (e.g., from the chip rendering the video frames and data to the companion chip for displaying the video frames for the left eye and right eye, and vice versa). As shown, the superframe 100 may stitch multiple smaller frames, sub-frames 102, into one large frame. Although the depicted embodiment shows six sub-frames 102A-F that represents a particular embodiment, the systems and methods described herein may use one or more sub-frames 102 (e.g., two, eight, twelve, twenty, and so forth). In some embodiments, multiple sources (e.g., CPU or GPU) may provide the video data for the sub-frames 102.

The chip may transport the superframe 100 line by line when all data sources in a line have the respective data ready for transportation to the destination (e.g., the second chip). As previously discussed, the second chip may split the superframe 100 into the multiple smaller frames (e.g., the sub-frames 102) since the second chip may process each data type separately. In some embodiments, the display system may process the superframe 100 directly rather than using the second chip for splitting the superframe 100 into smaller frames for displaying the image data.

The first chip may transport the superframe 100 in a raster scan order over one or more low power display ports (LPDP) links, and second frame may receive the superframe 100 data in the raster scan order. In a raster scan frame, the frame is subdivided into a sequence of stripes or rectangles, referred to as "scan lines." The scanning is performed left to right and top to bottom. That is, scanning may begin at the left of the highest scan line, move to the right through the end of the scan line, may blank, and move back to the left and down one scan line for scanning the next line. Thus, the raster scan may include scanning in a line by line order or an order of input or outputs.

In some embodiments, a single superframe 100 may correspond to a single LPDP link (e.g., five superframes 100 transported over five LPDP links, respectively). In general, the frames of video data may include non-overlapping arbitrary rectangles of sub-frames 102 placed within the superframe 100. However, in the raster scan order, the data on top will be sent earlier than the data on the bottom. As such, latency-critical data or particular data that needs to be transported relatively faster than other data, may be placed at the top of the superframe 100. Moreover, the sub-frames 102 may be placed side by side and may be bound together, such that they are both available in a given scan line to facilitate the transport. By way of example, one of the sub-frames 102 (e.g., for a particular camera) (e.g., the sixth sub-frame 102F (sub-frame 6)) may be slower than the other sub-frames 102 (e.g., the first through the fifth sub-frames 102A-E (sub-frame 1 through sub-frame 5)), and the slower sub-frame 102 may delay the transfer for the faster sub-frames 102. As such, the faster sub-frames 102 may be placed at the top of the superframe 100 and the slower sub-frame 102 may be placed alone and at the bottom of the superframe 100 to avoid delaying transportation of the faster sub-frames 102.

As previously mentioned, the superframe 100 may include metadata (that may include the mesh parameters), matting data, and video data for both left eye and right eye. The left and the right eyes video may be placed side by side in the superframe 100. In some embodiments, the display system consumes video data for both the left and right eyes at the same time, and thus, placing the left and the right eyes video data side by side may facilitate a lowest possible latency and minimum buffer usage.

The metadata and mesh parameters set up configuration of the image data processing circuitry 30 for a respective chip and/or device 10. As such, and since the data is transported in raster scan order, the metadata and mesh parameters may be placed at the top of the superframe 100 so that they are the first to arrive. Moreover, the image data processing circuitry 30 may use matting data to blend graphics and camera video to generate a final output for the video data. As such, in some embodiments, interleaving the matting data and video data in the superframe 100 may minimize overall latency. By way of example, if the superframe 100 is subdivided into four quarters, the superframe 100 may include a quarter video frame interleaved with a quarter matting data frame. After receiving this data at the display system for display, the display system may generate a quarter frame of output without having to wait for an entire frame to arrive.

As previously discussed, the superframe 100 may include the matting data before the video data, ensuring that matting data has been implemented for the upcoming video data. In embodiments including both tile and linear formatted data (e.g., as the rendered image data), the tile data (e.g., the left and right eyes video data) may be grouped into one rectangle area and received at the first chip via a generic pipe (GP) (e.g., GP0). Similarly, the linear data (e.g., the metadata and matting data) may be grouped into one rectangle area and received at the first chip via another GP (e.g., GP1). By way of example, GP0 may read tile data (e.g., graphics and alpha) from memory and convert the data to pixel format (e.g., 8-bit, 12-bit, 24-bit, 30-bit, 36-bit, 48-bit, and so forth), and the other GP1 may read the linear data (e.g., 8-bit, 16-bit, 32-bit data, and so forth) and pad it to the pixel format. When generating the superframe 100, a blend module (e.g., of the image data processing circuitry 30) may stitch both the GP0 and GP1 frames together.

The space remaining between sub-frames 102 may waste bandwidth, buffer, and/or power. To avoid this waste, the sub-frames 102 may be positioned without or approximately without space between the sub-frames 102 (e.g., tightly packed in the superframe 100). In some embodiments, memory buffer allocation may be based on the entire superframe 100 rather than the individual sub-frames 102. In additional or alternative embodiments, the superframe 100 stride granularity may be 128 bytes, the superframe 100 base address may be 128 byte aligned, the superframe 100 may include multiples of 16 pixels, and/or the sub-frames 102 may start at the 128 byte boundary. The LPDP links rate may also be changed and the size of the superframe 100 may be changed frame by frame, though the present execution may be interrupted.

Figure 14:
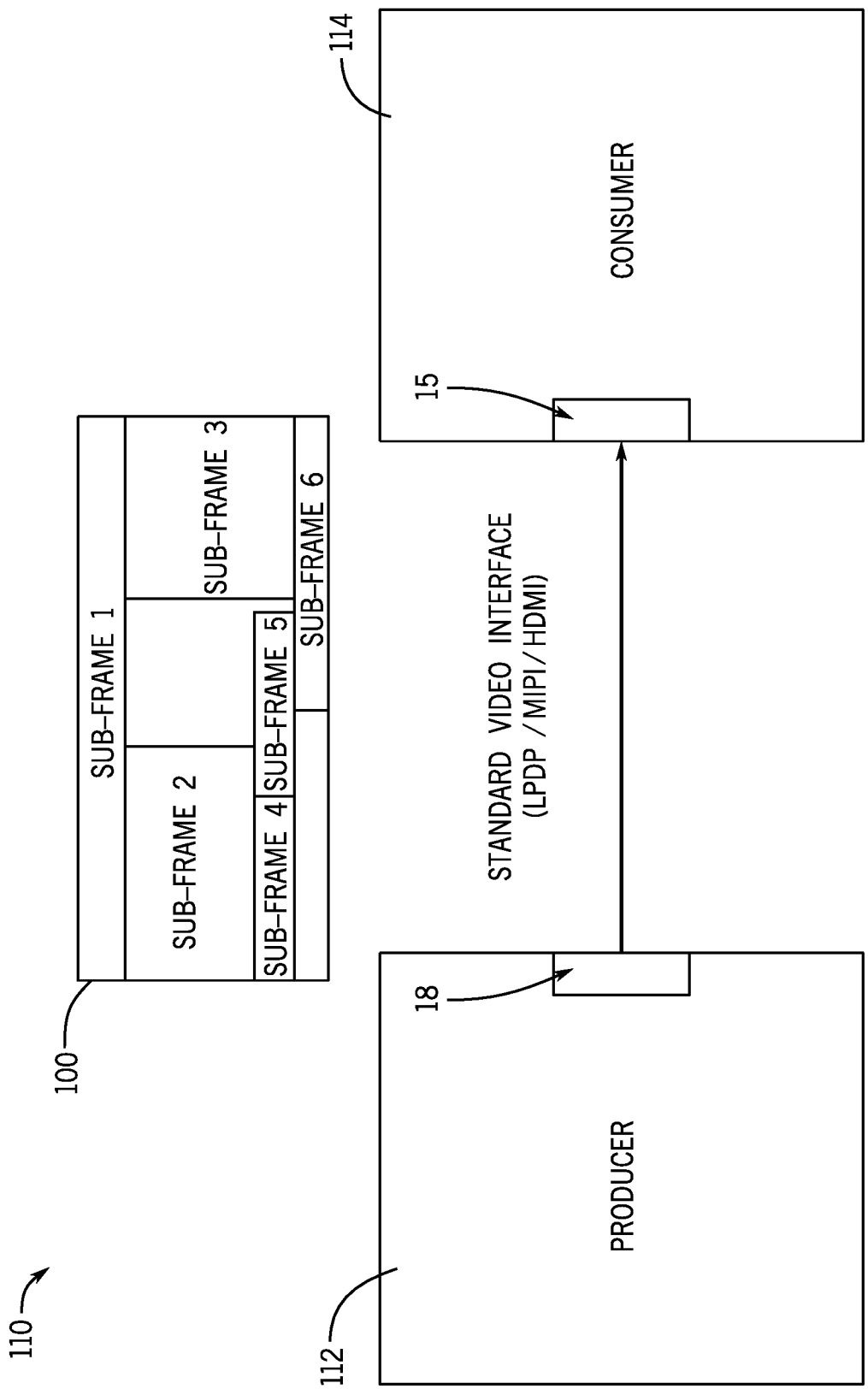
FIG. 14 is a block diagram of production and consumption of video image data using the superframe, in accordance with an embodiment.

FIG. 14 illustrates the production and consumption of video image data. As shown, a producer 112 (e.g., an electronic device 10) may produce video image data, capture image data, and/or render the video image data on one or more associated (e.g., connected or integrated) displays 18. Specifically, the producer 112 may be an image source that receives video image data and/or includes one or more cameras 15 that capture the video image data. The producer 112 may also include and a graphics processing unit (GPU) that renders the captured video image data. Although the depicted embodiment shows the producer 112 including both the one or more cameras 15 and the display 18 on the same electronic device 10, which represents a particular embodiment, the systems and methods described herein may include the one or more cameras 15 and the display 18 on different electronic devices 10 and/or different chips (of the same electronic device 10 or different electronic devices 10).

The producer 112 may send the video image data for processing to a consumer 14 (e.g., another electronic device 10 and/or another chip) via a superframe 100, for example, rather than multiple frames of video image data sent one at a time. As previously mentioned, the superframe 100 may include sub-frames 102 of data, such as image data, video data, graphics mesh data, camera mesh data, matting mesh data, and/or other types of data. In some embodiments, the other types of data may include non-video or non-image related data for a non-video or non-image related environment. The data may be based on application usage, data parameters associated with the application, and/or device type (e.g., configuration files for the consumer 114).

The superframe 100 may be communicated between the producer 112 and the consumer 114 using one or more interfaces or protocols, such as Low Power Display Port (LPDP) links. Additionally or alternatively to the LPDP links, the producer 112 and the consumer 114 may communicate the image data using Mobile Industry Processor Interface (MIPI) and/or High-Definition Multimedia Interface (HDMI), and the like. Briefly, and as will be discussed in detail with respect to FIG. 15, the consumer 114 may perform image processing (e.g., via the image data processing circuitry 30 of the consumer 114) on the superframe 100 after receiving it from the producer 112. For example, the consumer 114 may receive the superframe 100, decompress it into multiple sub-frames 102, and transport the sub-frames 102 for display on the display 18 (e.g., associated with the producer 112). In some embodiments, the consumer 114 may generate another superframe 100 after decompressing the received superframe 100 into multiple sub-frames 102, and then transport the superframe 100 (e.g., different than the superframe 100 received from the producer 112) to the producer 112 for displaying the image data.

In other embodiments, the consumer 114 may include one or more cameras 18. In such embodiments, the consumer 114 may process (e.g., compress) the captured image or video, and send a superframe 100 of image data (e.g., video stream, mesh parameters, etc.) to the producer 112 for rendering the video on the display 18. In summary, the producer 112 (e.g., an image source) may capture image data via one or more cameras 15 and/or produce image data, send the image data to the consumer 114 via the superframe 100, the consumer 114 may process the image data via the image data processing circuitry 30, pack the data into another superframe 100, and send the superframe 100 for displaying on a display 18 connected to the consumer 114 or to an electronic device 10 that includes the display 18, such as the producer 112. That is, the electronic devices 10 and/or chips that produce the image data, process the image data, and display the image data, may each receive and/or transport the respective image data in a single superframe 100 (rather than multiple frames) in an efficient manner using existing protocol. The electronic device 10 and/or chip producing or capturing the image data may transport a superframe 100 to another electronic device 10 or chip processing the image data, the electronic device 10 and/or chip processing the image data may perform the processing and send another superframe 100 to the electronic device 10 or chip that includes the display 18 (same or different device than the electronic device 10 that produces the image data).

Figure 15:
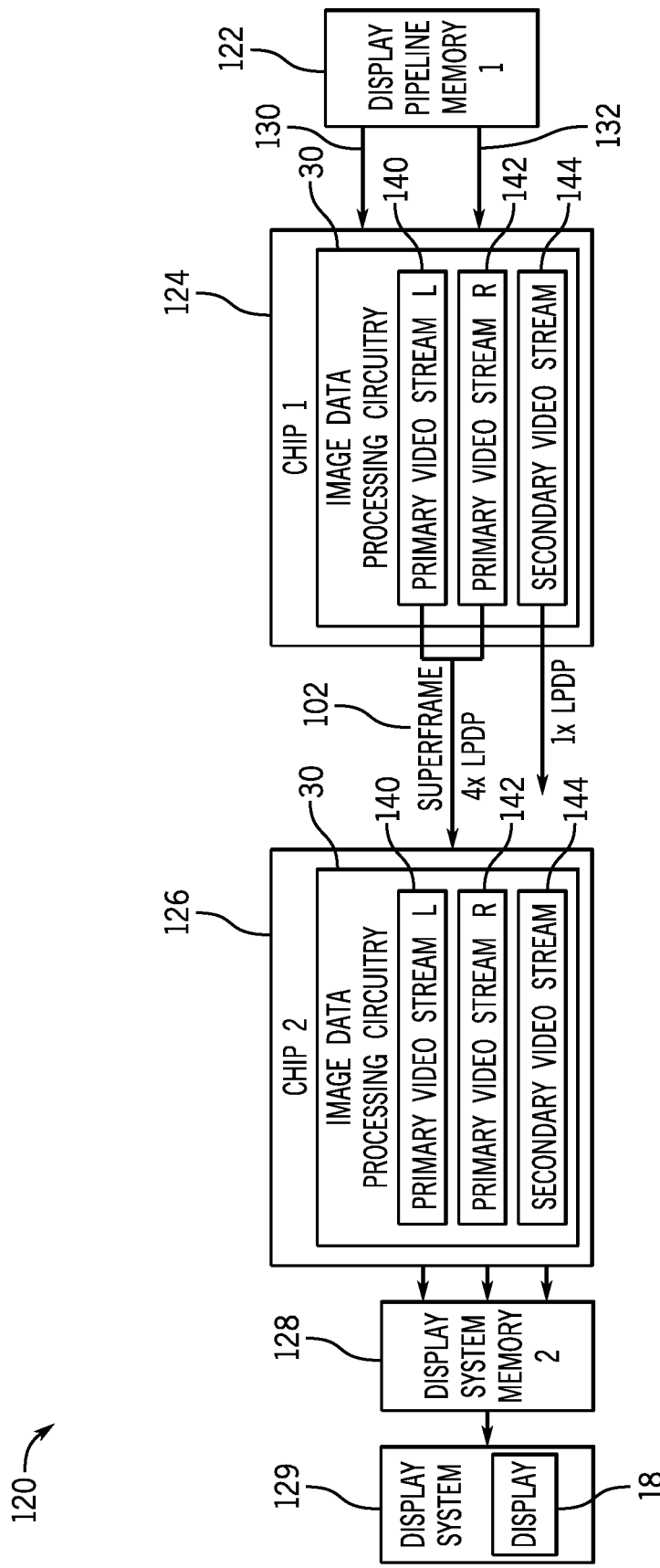
FIG. 15 is a block diagram of transportation of video image data between chips using the superframe, in accordance with an embodiment.

Turning to an illustration of transportation and consumption of video data (e.g., image data) between a first chip (e.g., of the first electronic device 10) rendering video data and a second chip (e.g., of the second electronic device 10) processing the video data for displaying, FIG. 15 is a block diagram of the transportation 120 of the video data between chips using the superframe 100. As shown, the transportation 120 may include a first display pipeline memory 122 (display pipeline memory 1), a first chip 124 (chip 1), a second chip 126 (chip 2), a second display pipeline memory 128 (display pipeline memory 2), and a display system 129. The first display pipeline memory 122 may be associated with and correspond to the first chip 124. Specifically, the first display pipeline memory 122 may include a low port display port (LPDP) memory (e.g., DRAM) that receives (e.g., via a display port connecting cable or wirelessly) and/or stores the video data. In some embodiments, the video data may include frames from one or more cameras (e.g., one camera, two cameras, fourteen cameras, twenty cameras, and so forth). Moreover, the first display pipeline memory 122 may receive the video data from multiple sources including, but not limited, a CPU, an ANE, and/or a GPU. Additionally or alternatively, the video data may be data from multiple cameras associated with the second chip 126 (e.g., the companion chip). Thus, although the following descriptions for the depicted embodiment describe transportation from the first chip 124 to the second chip 126, the systems and methods described herein may apply to transportation back and forth between both the first chip 124 and the second chip 126 that may be associated with different devices. By way of example, the second chip 126 may capture video data through multiple associated cameras, send the video data to the first chip 124 for rendering the video data, and the first chip 124 may transport the video data to the second chip 126 for displaying. The video data may be stored in the second display pipeline memory 128 and consumed by the display system 129 (e.g., associated with the first chip 124 and the first electronic device 10). Although the following descriptions describe transportation and consumption of video data as the image data, the systems and methods described herein may also apply to non-video data.

In the depicted embodiment, the first chip 124 reads data from buffers of the first display pipeline memory 122. In some instances, the data may include different types of data and/or in different formats. For example, the data may be in a linear format or a tile format. In some embodiments, the first chip 124 may receive the tile data over a first GP 130 (e.g., GP0) and linear data over a second GP 132 (e.g., GP1). As such, the tile data may be grouped together and the linear data may be grouped together prior to the first chip 124 receiving the video data. By way of example, the video data (e.g., video stream for left and right eyes) may be written in tile format, the matting data may be written in linear format, and non-video data may be written in linear format.

The video data from the first display pipeline memory 122 (e.g., via the first GP 130) may include a left primary video stream 140 (primary video stream L) and a right primary video stream 142 (primary video stream R). The left primary video stream 140 may include the data for displaying an image for the left eye, the matting data for the left eye, and the metadata for the left eye. Similarly, the right primary video stream 142 may include the data for displaying an image for the right eye, the matting data for the right eye, and the metadata for the right eye. The image data processing circuitry 30 for the first chip 124 may compress the primary video streams 140, 142 and transport it via a superframe 100. Specifically, the image data processing circuitry 30 may compress multiple frames (e.g., sub-frames 102) of video data from the video streams 140 and 142 into a single superframe 100, as discussed with respect to FIG. 13. The image data processing circuitry 30 may multiplex the video data (e.g., frames of data for the left primary video stream 140 and the right primary video stream 142 from multiple buffers of the first display pipeline memory 122).

The video data from the first display pipeline memory 122 (e.g., via the second GP 132) may include a secondary video stream 144, which includes ordinary video data (e.g., RGB101010) that is not compressed prior to transporting. Generating the superframe 100 facilitates transporting the video data as ordinary video, which may be the compatible and fastest format for processing at the second chip 126. In some embodiments, the primary video streams 140, 142 may be processed at a first rate (e.g., 90 Hz or at 96 Hz) while the secondary video stream 144 may be processed at a second rate (e.g., 48 Hz or 60 Hz). Additionally, as previously discussed, the first chip 124 may receive the video data over multiple LPDP links. In the depicted embodiment, the first chip 124 transports the superframe 100 over one LPDP link having 4 LPDP lanes and the secondary video stream in ordinary video format over another LPDP link having one LPDP lane. In additional or alternative embodiments, the first chip 124 may send the superframe 100 one or more multiple LPDP links with one more lanes. By way of example, the superframe 100 size may be equal to or approximately equal to 3968 (e.g., width)×1825 (e.g., height) pixels (e.g., for 90 Hz superframe 100), with a maximum size of 1792×1632 pixels of video. By way of another example, the height and/or width of the superframe 100 may be greater than the height and/or width of any of the sub-frames 102 (e.g., the smallest sub-frame, the largest sub-frame, and so forth), such as 1.5 times, 2 times, 5 times, and so forth, of the height and/or width of any of the sub-frames 102. In some embodiments, the superframe 100 size may be equal to or approximately equal to 1312×1184, 1568×1440, 1792×1632, 2144×1760, 3968×2232 pixels, 3893×1825, 3968×3968, 5120×4096, and so forth.

In general, the second chip 126 may function as a companion chip to the first chip 124 by expanding functionalities of the first chip 124 (e.g., rendering video data to chips and devices processing data for display). After receiving the superframe 100 from the first chip 124, the second chip 126 may decompress the superframe 100 into smaller frames, such as back to the sub-frames 102. The image processing circuitry 30 for the second chip 126 may split the superframe 100 into the left primary video stream 140, the right primary video stream 142, and the secondary video stream 144. That is, the image data processing circuitry 30 may split the superframe 100 into video for the left and right eyes, matting data for the left and right eyes, graphics mesh, camera mesh, and/or matting mesh for the left and right eyes, and metadata for the left and right eyes based on pixel location of the superframe 100.

In some embodiments, the second chip 126 may split the superframe 100 into the sub-frames 102 based on the reading and writing formats of the second chip 126. Thus, the second chip 126 may reformat the pixels and demultiplex the superframe 100 back to the primary video streams 140, 142. As previously discussed, the pixel order of the video from the superframe 100 is in raster scan order. In some embodiments, the video data written to the memory uses tile format and as such, the image data processing circuitry 30 may convert the video data in linear format to tile format (e.g., linear-tile conversion) prior to storing. By way of example, the video data may be written in tile format, the matting data may be written in linear format, and non-video data may be written in linear format.

The second chip 126 may store the primary video streams 140, 142 and the secondary video stream 144 in the second display pipeline memory 128. Similar to the first display pipeline memory 122, the second display pipeline memory 128 may also include a LPDP memory (e.g., DRAM) that receives and/or stores the video data. The display system 129 may read the video data from the second display pipeline memory 128. Based on the video data, the display system 129, referred to as a "consumer" that uses data written to memory ready to be consumed, renders the video data at the display 18, which may be associated with the first device, the second device, and/or another device that is different than the first and second devices. As previously discussed, the display 18 may include a left eye and a right eye display that is perceived as a single display of video, such as for an entertainment system (e.g., image data sent to display(s) 18 of VR glasses).

Figure 16:
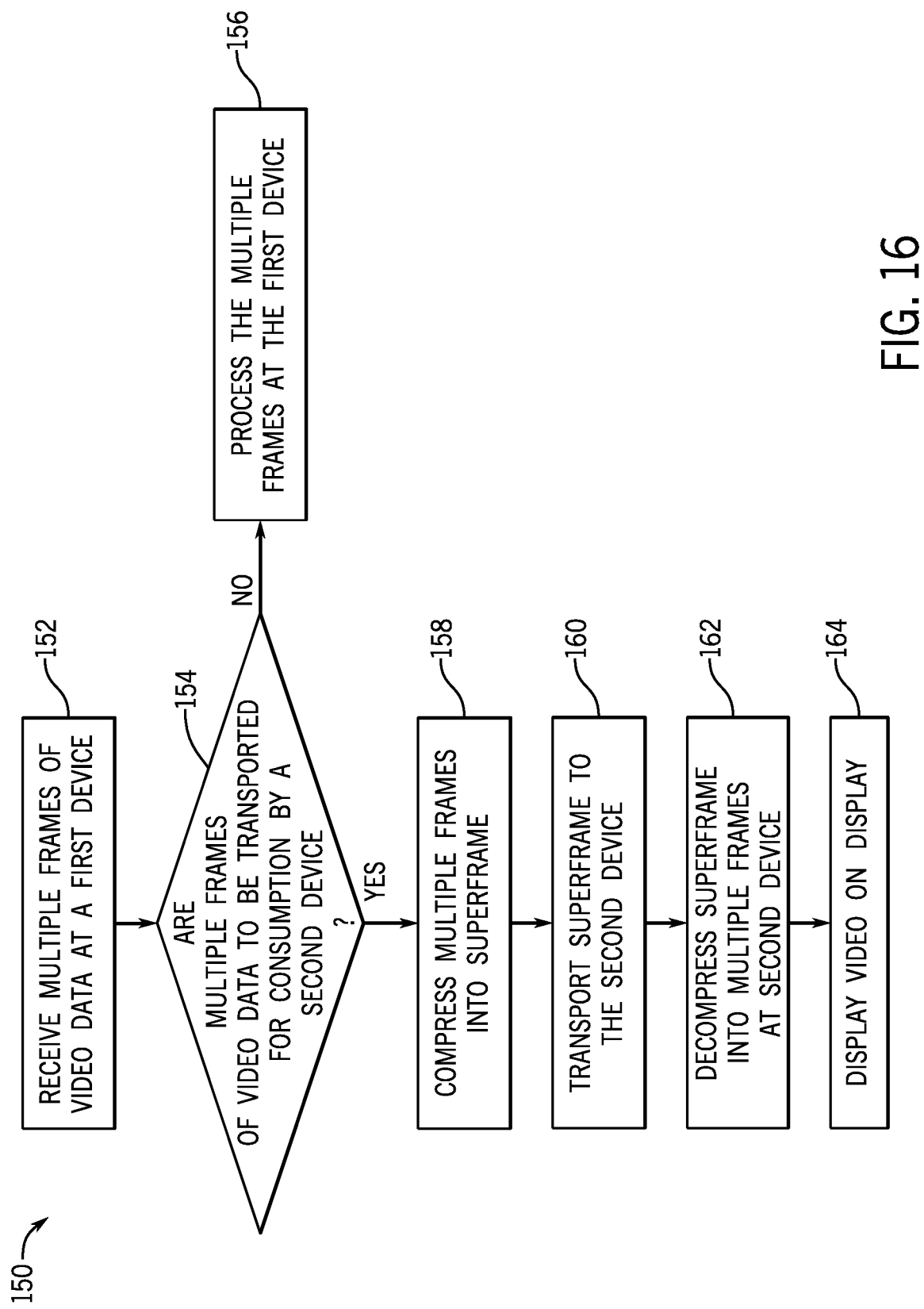
FIG. 16 is a flowchart of a process for transporting and consuming the superframe, in accordance with an embodiment.

FIG. 16 illustrates a process 150 for transporting and consuming the superframe 100. In some embodiments, the process 150 may be implemented by executing instructions stored in a tangible, non-transitory, computer-readable medium, such as the one or more memory devices 14, using a processor, such as the one or more processors 12 and/or the controller 40. While the process 150 is described using steps in a specific sequence, it should be understood that the present disclosure contemplates that the described steps may be performed in different sequences than the sequence illustrated, and certain described steps may be skipped or not performed altogether. Although the following discussions describe the process 150 performed with respect to different devices for rendering and displaying video data, the process 150 may additionally or alternatively be implemented on the same device that both renders and displays the video data.

As shown, the process 150 includes the controller 40 receiving (process block 152) multiple frames of video data at a first device (e.g., with the first chip 124 of FIG. 15). In particular, the first device may receive the left and the right eyes video data (e.g., video data), metadata, mesh parameters, and matting data from memory associated with the first device (e.g., the first display pipeline memory 122). The multiple frames of video data may be captured by and correspond to one or more cameras. As previously discussed, the first device may receive the video data (e.g., tile data) via a first generic pipe (GP) and the metadata and matting data (e.g., linear data) via a second GP that is different than the first GP.

After receiving the data, the controller 40 may determine whether (decision block 154) the multiple frames of video data are to be transported for consumption to a second device (e.g., with the second chip 126 of FIG. 15 and different than the first device). That is, the first device renders the video data (e.g., the left primary video stream 140, the right primary video stream 142, and the secondary video stream 144 (e.g., matting and mesh parameters data) of FIG. 15). However, the second device processes the video data for storage and subsequent consumption by the display system 129. The first device and the second device may include components (e.g., the first chip 124 and the second chip 126) that work together to execute certain applications, like VR, AR, and MR applications. As previously mentioned, the first device may render the video that is sent to the second device to display. Instead of creating a new interface to transport the video data between the two devices and/or their components, the first device may send a superframe 100 of the video data to the second device without adding overhead to the first device.

Multiple frames of video data from multiple cameras may use significant power and bandwidth for transporting the frames individually. Using the superframe 100 to transport the multiple frames may reserve power and bandwidth for other applications. Furthermore, in some embodiments, at least some of the data, such as the metadata for the multiple frames, may be the same or approximately the same (e.g., correlating or approximately correlating). By combining the multiple image frames (e.g., sub-frames 102) into the single superframe 100, common features of the multiple frames may be preserved in the superframe structure. This may allow the superframe 100 to be more efficiently transmitted to the second device than transmitting each of the multiple frames individually. In some embodiments, the matting data and/or the metadata may be sent through a separate channel, such as an LPDP link, and the superframe 100 may be sent over another LPDP link.

If the multiple frames of video data are not to be transported to the second device, then the controller 40 may process (process block 156) the multiple frames at the first device. That is, the same device may render the multiple frames from the multiple cameras, as well as process, adjust (e.g., apply enhancement, scaling, rotating, etc.), and store them for displaying. In additional or alternative embodiments, a first chip of the first device may render the multiple frames while a second chip of the first device stores the multiple frames for consumption by the display system 129. In such embodiments, the first device may benefit from combining the multiple frames into the superframe 100 for efficient transportation between the chips on the same device.

If the multiple frames are to be transported for consumption by the second device, then the controller 40 may compress (process block 158) or multiplex the multiple frames into a superframe 100. That is, as described with respect to FIG. 13, the multiple frames (e.g., sub-frames 102) may be stitched together into a single superframe 100. The multiple frames may include video data for both left and right eyes video data. In some embodiments, the superframe 100 may also include the metadata (including mesh parameters) and matting data. The multiple frames are transported in raster scan line order. The metadata and mesh parameters may be at the top of the superframe 100 since the controller 40 may configure the image data processing circuitry 30 of the second device using this data for displaying the multiple frames of image data.

After compacting the multiple frames in the superframe 100, the controller 40 may transport (process block 160) the superframe 100 from the first device to the second device. In some embodiments, the controller 40 may send the superframe 100 over a single LPDP link with one or more lanes (e.g., 4 LPDP lanes). As previously mentioned, in additional or alternative embodiments, the controller 40 may send the superframe 100 over multiple LPDP links with one more lanes. In some instances, the number of lanes for transporting the superframe 100 may be based on bandwidth. Thus, a larger number of lanes (e.g., 6 LPDP lanes) may increase bandwidth, and thus, facilitate transporting a larger superframe 100.

The superframe 100 may be have a predetermined height and/or width (e.g., pixel dimensions). By way of example, in one embodiment, the height of the superframe 100 may be within 5120 pixels and the width may be within 4096 pixels (e.g., 5120×4096 pixels). By way of another example, the superframe 100 size may be equal to or approximately equal to 1312×1184, 1568×1440, 1792×1632, 2144×1760, 3968×2232 pixels, 3893×1825, 3968×3968, 5120×4096, and so forth. In some embodiments, the display system 129 consuming the video data may not change resolution frame by frame, and as such, may use one-size superframe 100 to carry different resolution of video and metadata.

The controller 40 may decompress (process block 162) or demultiplex the superframe 100 into the multiple frames and data (e.g., sub-frames 102) at the second device. After decompressing, the second device may store the multiple frames and data on memory associated with the second device (e.g., second display pipeline memory 128 of FIG. 15). Next, the controller 40 may display (process block 164) the video on the display 18 through the display system 129. In particular, the controller 40 may cause the display system 129 to consume the video data (e.g., the multiple frames, matting data, and metadata) and display it. As previously discussed, the multiple frames may correspond to left and right eyes video data, and as such, the display system 129 may display multiple images or videos on a left eye display and a right eye display that a viewer may perceive as a single image. In some embodiments, the display system 129 may process the superframe 100, and as such, may decompress the superframe 100 without using the second device for decompression. Instead, the controller 40 may transport the superframe 100 from the first device to the display system 129.

In this manner, the techniques described herein may facilitate efficient transportation and consumption of video data via a single superframe 100 rather than multiple frames. By transporting via the superframe 100, the systems described herein may reduce power consumption and reserve bandwidth for other applications and processes. Additionally, using the superframe 100 may avoid creating a new interface to transport between multiple devices and/or multiple components (of the same or different devices).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   a first device rendering image data, configured to:
   render at least three frames of the image data;
   compress the at least three frames into a single superframe; and
   transport the single superframe;
   a second device storing the image data, configured to:
   receive the single superframe;
   decompress the single superframe into the at least three frames of image data; and
   store the image data on a memory of the second device; and
   a display panel configured to display the image data stored in the memory.

2. The system of claim 1, wherein the display panel is configured to render the image data in an extended reality environment.

3. The system of claim 1, wherein the single superframe comprises the at least three frames in a raster scan order.

4. The system of claim 1, wherein the second device is configured to receive the at least three frames of the single superframe in a raster scan order.

5. The system of claim 1, wherein the first device is configured to transport the single superframe comprising a video data of the image data via one low power display port (LPDP) link, comprising a plurality of LPDP lanes.

6. The system of claim 1, wherein the first device is configured to transport matting data, metadata, a mesh parameter, or a combination thereof, of the image data, via a single low power display port (LPDP) lane.

7. The system of claim 6, wherein the first device is configured to transport the matting data, the metadata, the mesh parameter, or any combination thereof, as original image data without compression.

8. Image processing circuitry configured to:
   receive a first at least three frames of image data corresponding to a video at a first device;
   compress the first at least three frames into a single frame;
   transport the single frame to a second device for displaying;
   decompress the single frame at the second device into a second at least three frames different than the first at least three frames, of the image data; and
   store the second at least three frames on a memory of the second device to facilitate displaying the video on a display panel.

9. The image processing circuitry of claim 8, wherein the image data comprises a left eye video data for displaying a left side video on the display panel, a right eye video data for displaying a right side video on the display panel, or a combination thereof.

10. The image processing circuitry of claim 9, wherein the single frame comprises the left eye video data and the right eye video data in a side-by-side order.

11. The image processing circuitry of claim 8, wherein the second at least three frames is in a linear format.

12. The image processing circuitry of claim 8, wherein the image data comprises a video data, wherein the single frame comprises the image data in a tile format.

13. The image processing circuitry of claim 8, wherein the image data comprises a non-video data comprising a matting data, a metadata, a mesh parameter, or any combination thereof, wherein the single frame comprises the image data in a linear format.

14. The image processing circuitry of claim 8, wherein the single frame comprises a first portion and a second portion, wherein the first portion comprises linear format data and the second portion comprises tile format data.

15. The image processing circuitry of claim 8, wherein the single frame comprises a metadata associated with a video data, a matting data associated with the video data, or a combination thereof, wherein the metadata and the matting data are disposed in a higher priority order than the video data in a raster scanning order.

16. The image processing circuitry of claim 8, wherein the single frame comprises a height that is greater than at least two times a sub-frame height of each of the first at least three frames.

17. The image processing circuitry of claim 8, wherein the image processing circuitry is configured to compress the first at least three frames in response to the first at least three frames comprising correlating or approximately correlating metadata.

18. An electronic device comprising:
   a display panel;
   a camera; and
   a first chip comprising image processing circuitry, configured to:
   receive at least three frames of video data from the camera;
   multiplex the at least three frames into a single superframe;
   transport the single superframe to a second chip of the electronic device to facilitate displaying the video data on the display panel, and wherein the second chip is configured to generate an additional single superframe to send to the first chip; and
   receive the additional single superframe from the second chip of the electronic device.

19. The electronic device of claim 18, wherein the second chip is configured to demultiplex the single superframe into smaller frames for storing on a memory associated with the second chip, wherein the display panel consumes the smaller frames from the memory to render a video based on the video data.

20. The electronic device of claim 18, wherein each of the at least three frames are associated with a priority level based at least in part on latency, and wherein an arrangement of the at least three frames in the single superframe is based at least in part on the priority level of each of the at least three frames.

21. A system comprising:
   a producer, wherein the producer comprises one or more cameras, one or more displays, and image processing circuitry configured to:
   receive a plurality of frames of video data;
   compress the plurality of frames of video data into a first superframe; and
   transport the first superframe to a consumer; and
   the consumer, wherein the consumer comprises image processing circuitry configured to:
   receive the first superframe;
   decompress the first superframe into the plurality of frames of video data;
   generate a second superframe based on the plurality of frames of video data; and
   transport the second superframe to the producer to facilitate displaying the video data on the one or more displays of the producer.

22. The system of claim 21, wherein the producer comprises an image source and the consumer is connected to an electronic display that displays the video data.

* * * * *